United States Patent
Nakamae et al.

[11] Patent Number: 5,809,624
[45] Date of Patent: Sep. 22, 1998

[54] FILM STRETCHING STRUCTURE

[75] Inventors: Satoshi Nakamae; Hitomu Watanabe; Hiroshi Kojima; Makoto Honda, all of Sinjuku-Ku, Japan

[73] Assignee: Dai Nippon Printing Co., Ltd., Japan

[21] Appl. No.: 866,073

[22] Filed: May 30, 1997

[30] Foreign Application Priority Data

May 31, 1996 [JP] Japan ................................. 8-159190

[51] Int. Cl.$^6$ .................................................. D06C 3/08
[52] U.S. Cl. .................................. 26/88; 26/87; 38/102.1
[58] Field of Search .................................. 26/51, 71, 87, 26/88, 89, 90, 98, 97; 38/102, 102.1, 102.2, 102.3, 102.4; 264/291, 292

[56] References Cited

U.S. PATENT DOCUMENTS

| | | | |
|---|---|---|---|
| 2,893,162 | 7/1959 | Knowles | 38/102.1 |
| 2,988,772 | 6/1961 | Horn | 26/88 |
| 3,109,218 | 11/1963 | Morgan | 26/88 |
| 3,124,834 | 3/1964 | Vandierendonck | 26/88 |
| 3,132,375 | 5/1964 | Koppehele | 26/88 |
| 4,578,775 | 3/1986 | Dang et al. | 38/102.1 |
| 5,136,797 | 8/1992 | Hildebrandt | 38/102.1 |
| 5,222,314 | 6/1993 | Inteso | 38/102.2 |
| 5,355,564 | 10/1994 | Gunter, Jr. et al. | 26/88 |
| 5,396,721 | 3/1995 | Levine et al. | 38/102.3 |
| 5,502,906 | 4/1996 | Yamawaki | 38/102.3 |
| 5,517,737 | 5/1996 | Viltro et al. | 26/88 |

*Primary Examiner*—Amy B. Vanatta
*Attorney, Agent, or Firm*—Parkhurst & Wendel

[57] ABSTRACT

A film stretching structure holds a non-self-supporting film, sheet or the like taut so that the film, sheet or the like may not crease or slacken. The film stretching structure comprises a frame structure having, as principal components, a quadrangular outer frame having two opposite side members for supporting a film, a sheet or the like thereon, and an inner frame having side members substantially parallel to those of the outer frame, respectively, and disposed inside the outer frame so as to form gaps between the side members of the outer frame and the corresponding side frames of the inner frame, respectively, and bar-shaped stretching members. A film, a sheet or the like is supported on the two opposite side members of the outer frame, and the stretching members are pushed together with portions of the film, the sheet or the like into the gaps contiguous with the opposite side members of the outer frame supporting the film, the sheet or the like to stretch the same. The film stretching structure has a relatively simple construction and is capable of holding the film, the sheet or the like taut without allowing the same to crease or slacken.

24 Claims, 27 Drawing Sheets

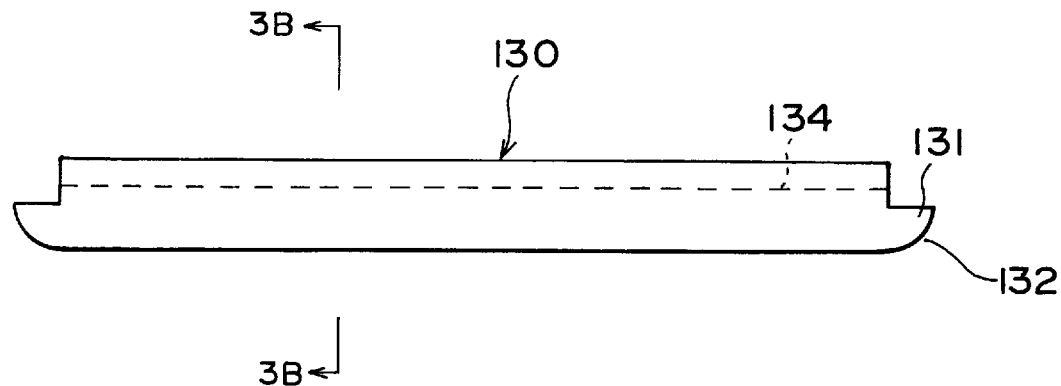
F I G. 3(a)
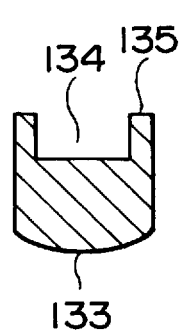
F I G. 3(b)
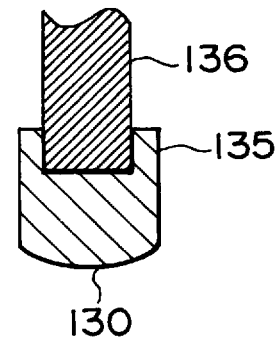
F I G. 3(c)

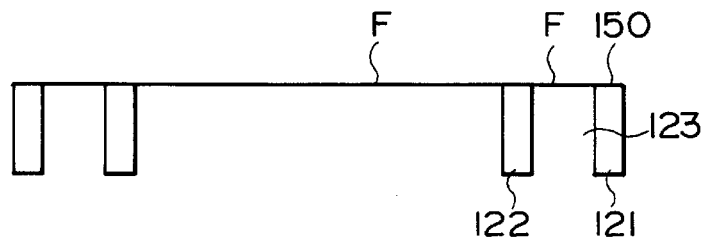
FIG. 4(a)
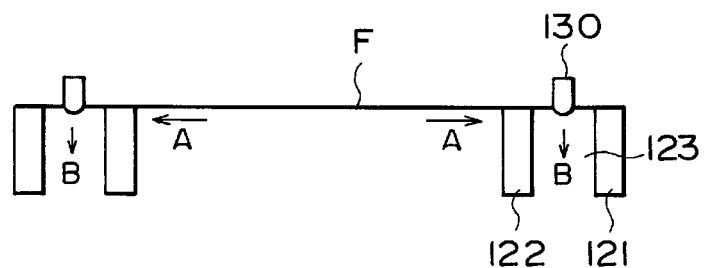
FIG. 4(b)
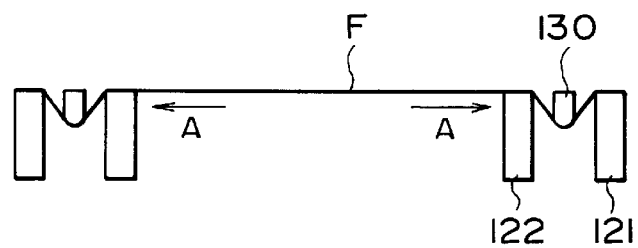
FIG. 4(c)
FIG. 5
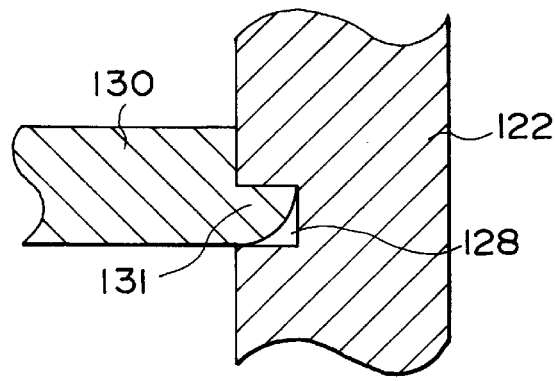

F I G. 8(a)
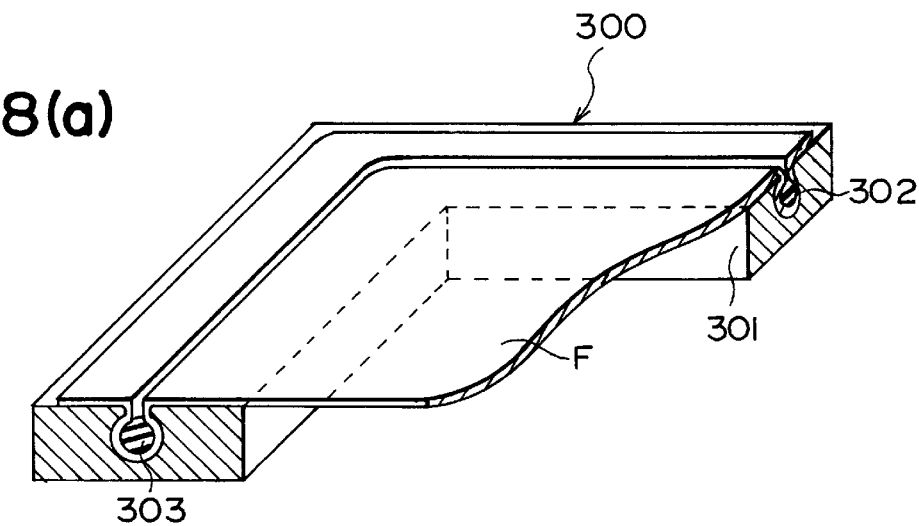
F I G. 8(b)
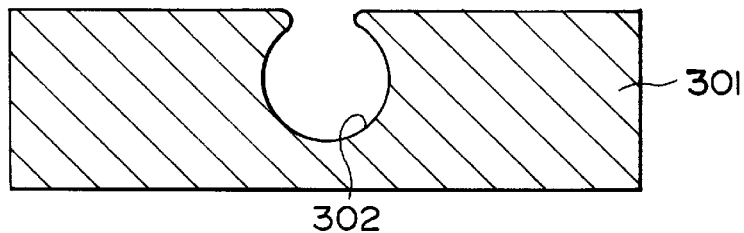
F I G. 8(c)
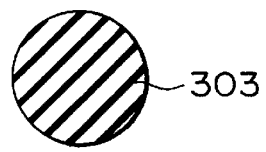

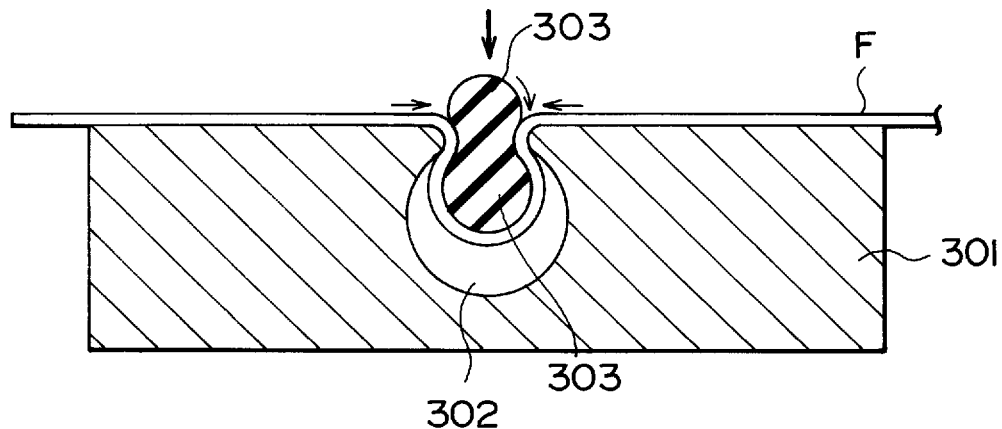
F I G. 12 (a)
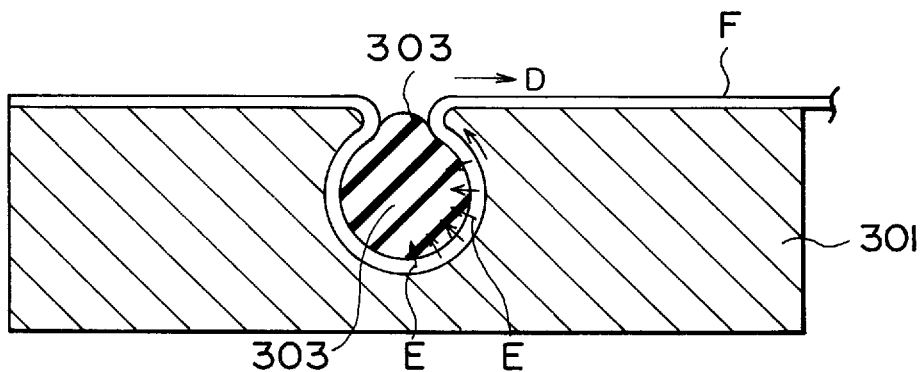
F I G. 12 (b)

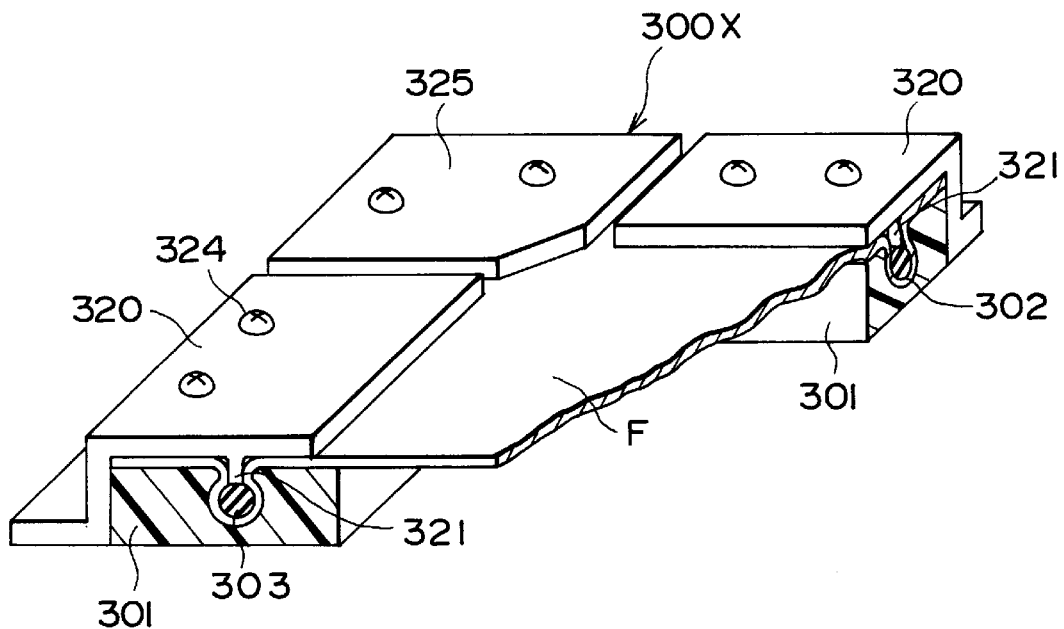
F I G. 13(a)
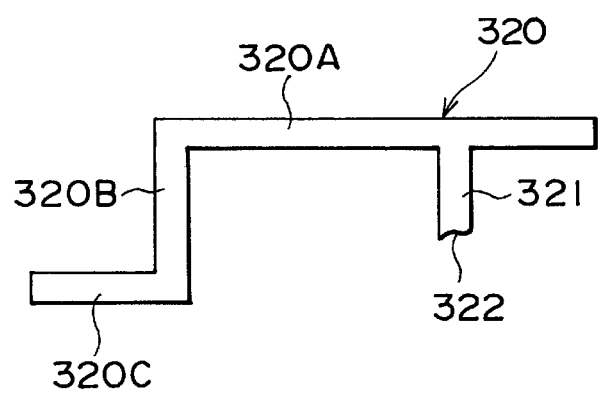
F I G. 13(b)

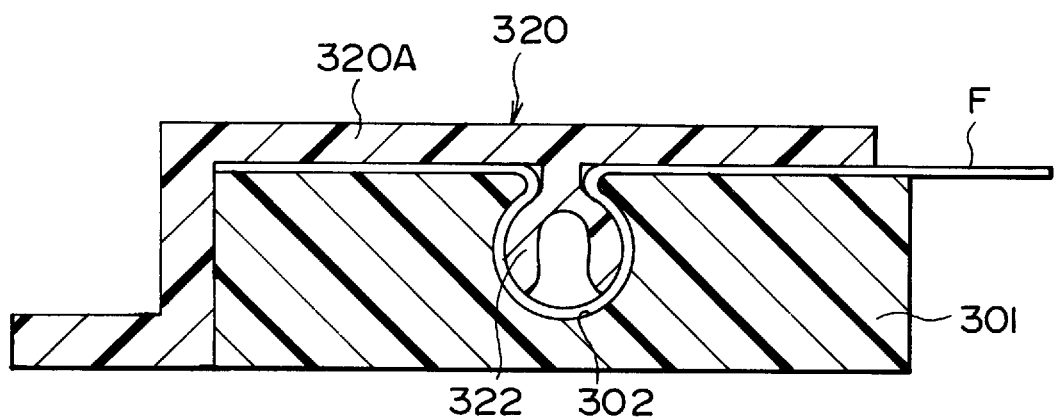
F I G. 14 (a)
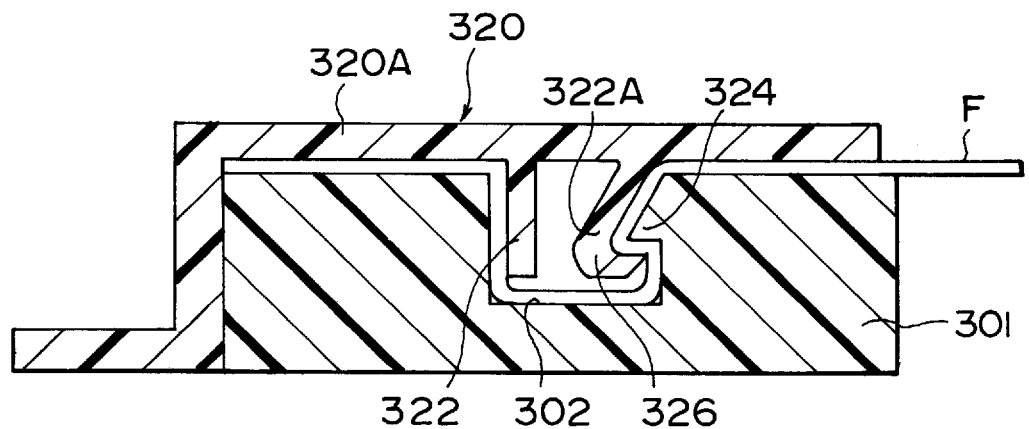
F I G. 14 (b)
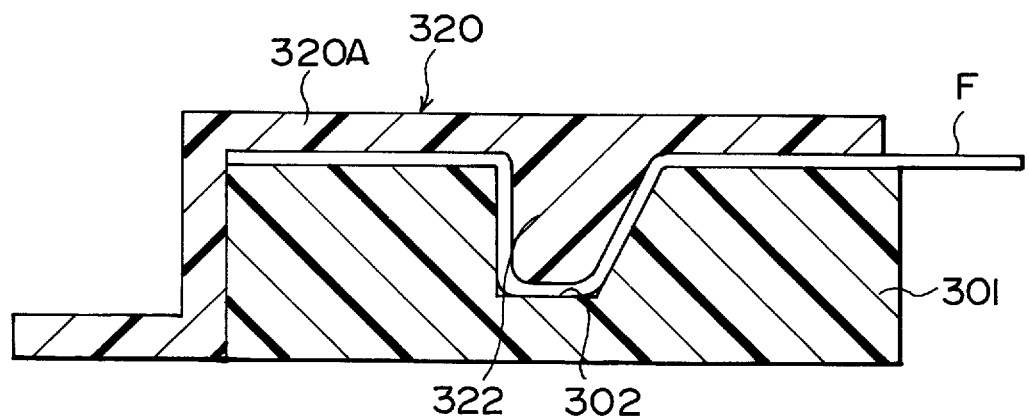
F I G. 14 (c)

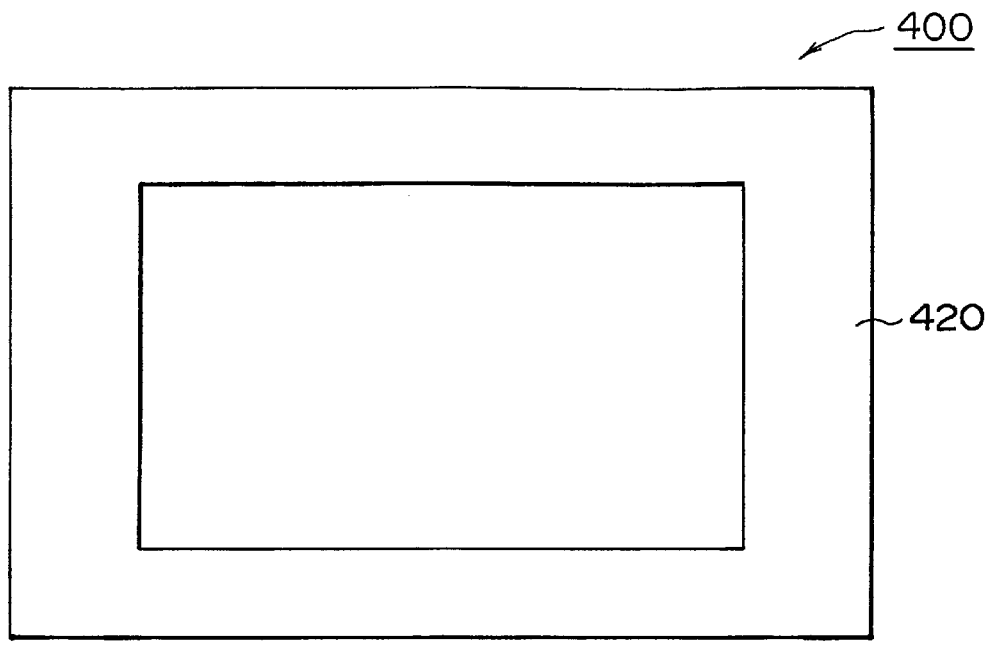
F I G. 15(a)
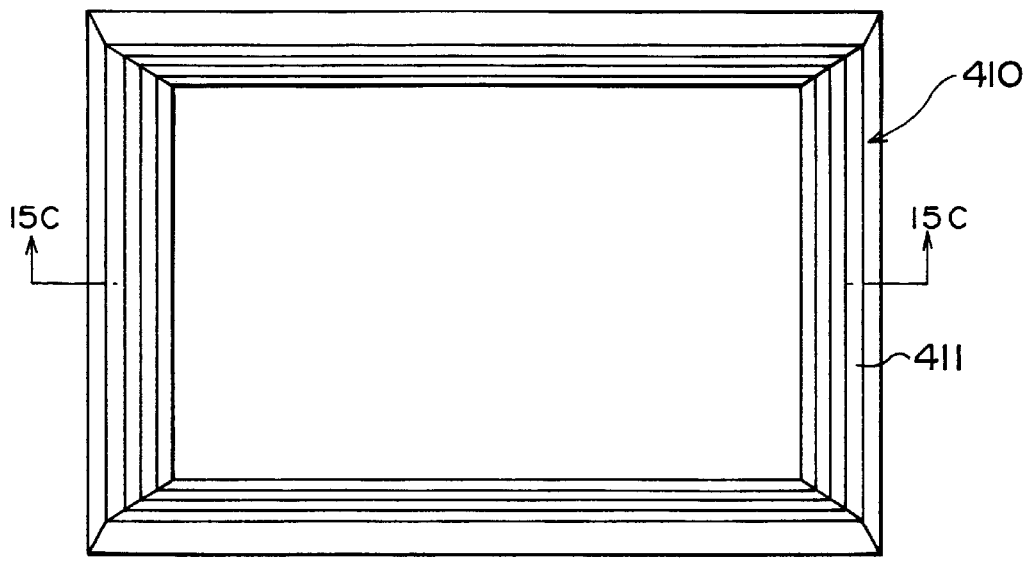
F I G. 15(b)
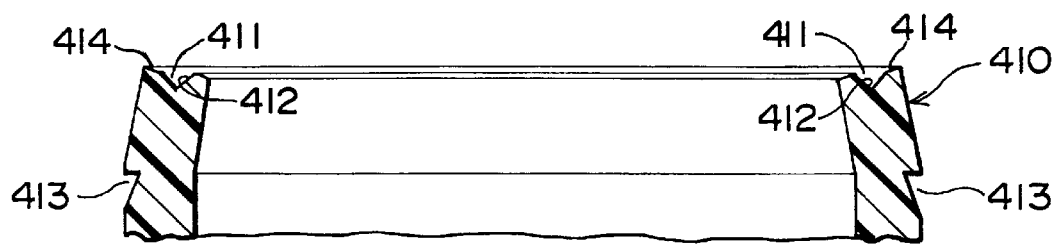
F I G. 15(c)

F I G. 16(a)
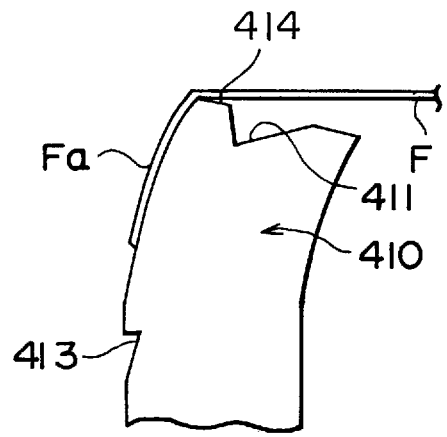
F I G. 16(b)
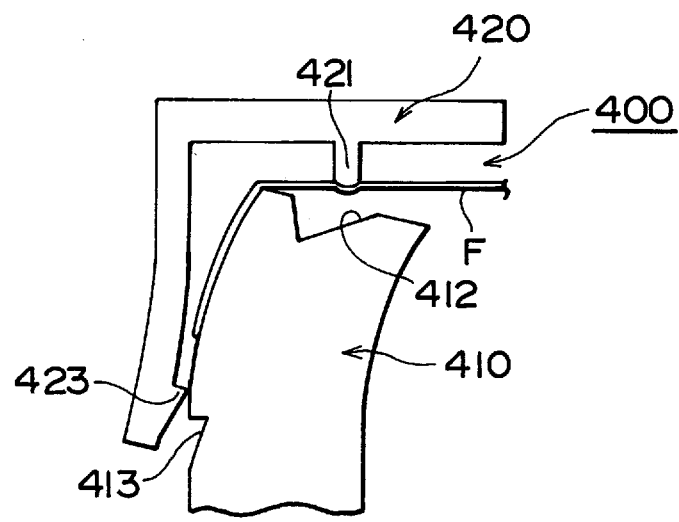
F I G. 16(c)
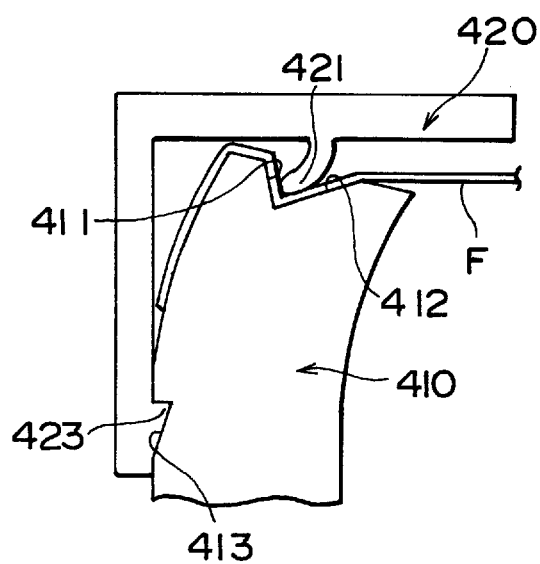

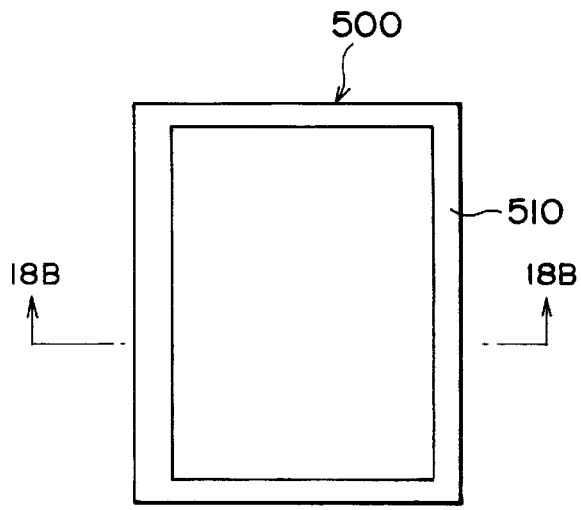
F I G. 18(a)
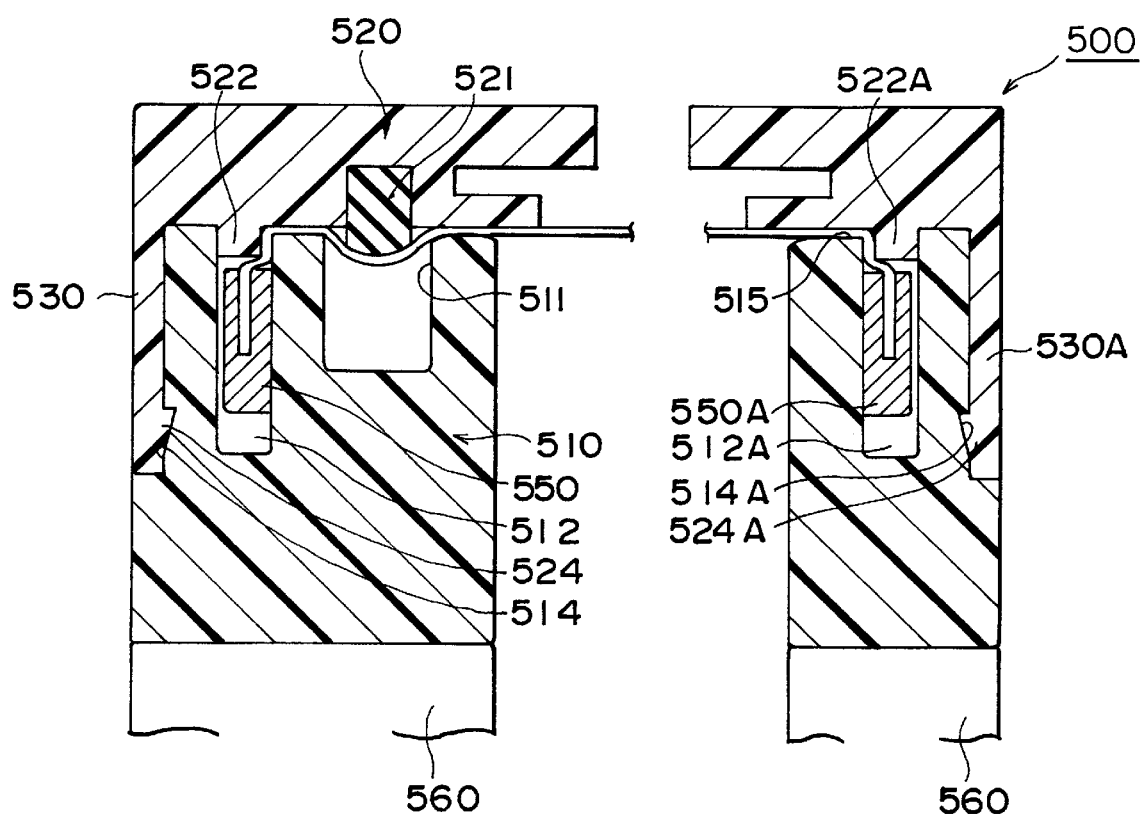
F I G. 18(b)

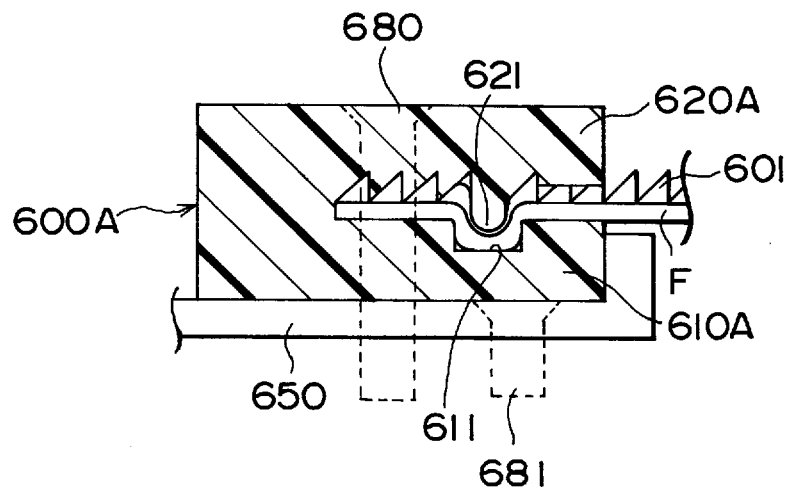
F I G. 23
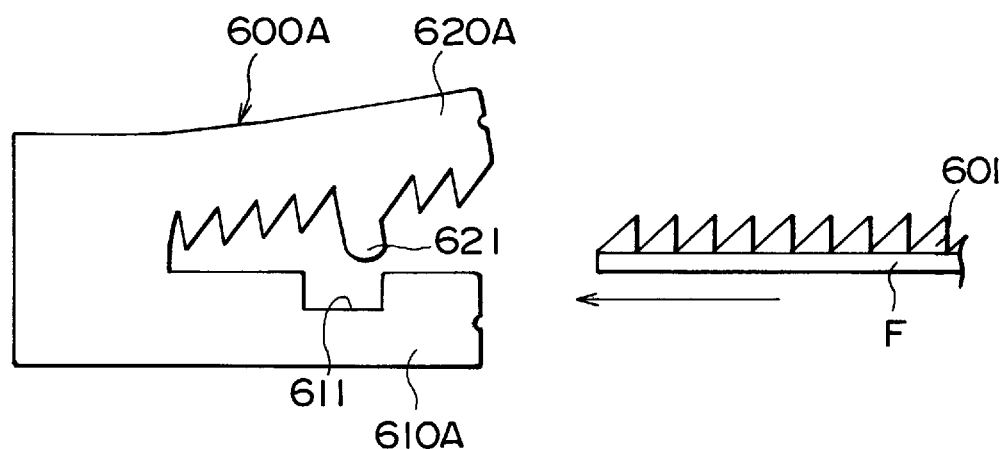
F I G. 24

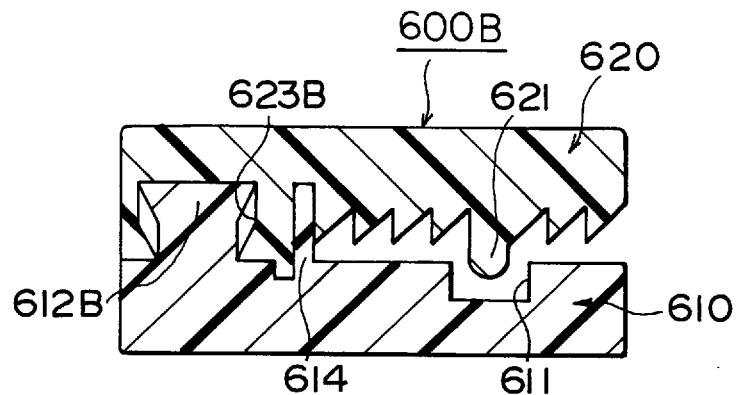
F I G. 25 (a)
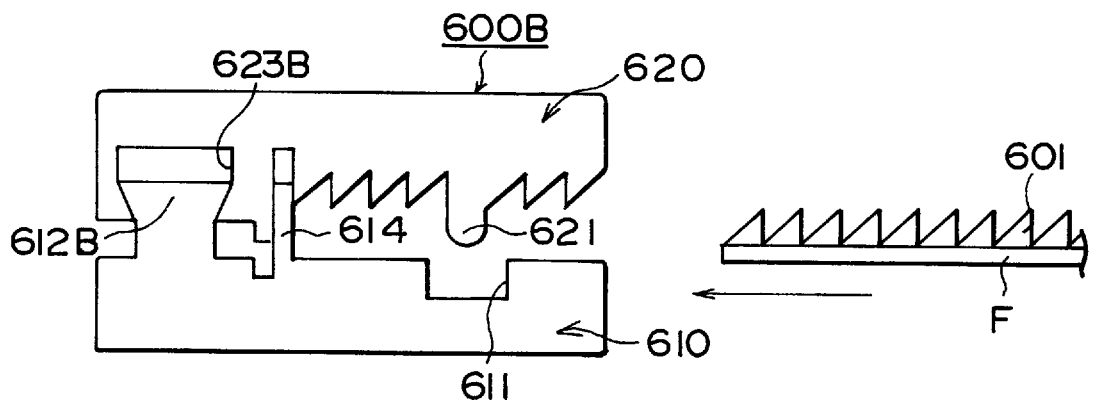
F I G. 25 (b)
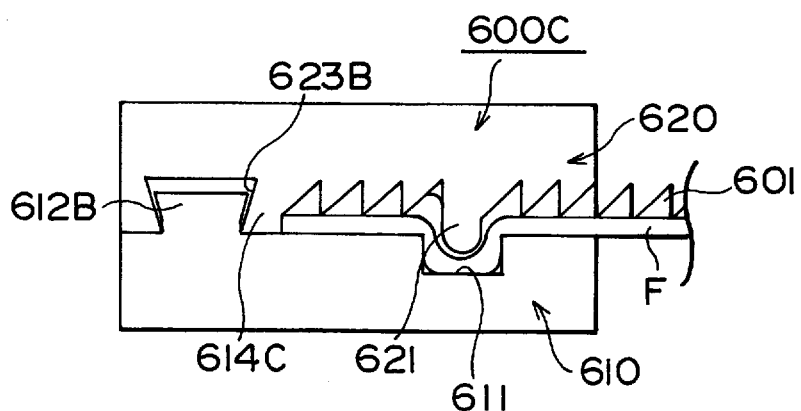
F I G. 26

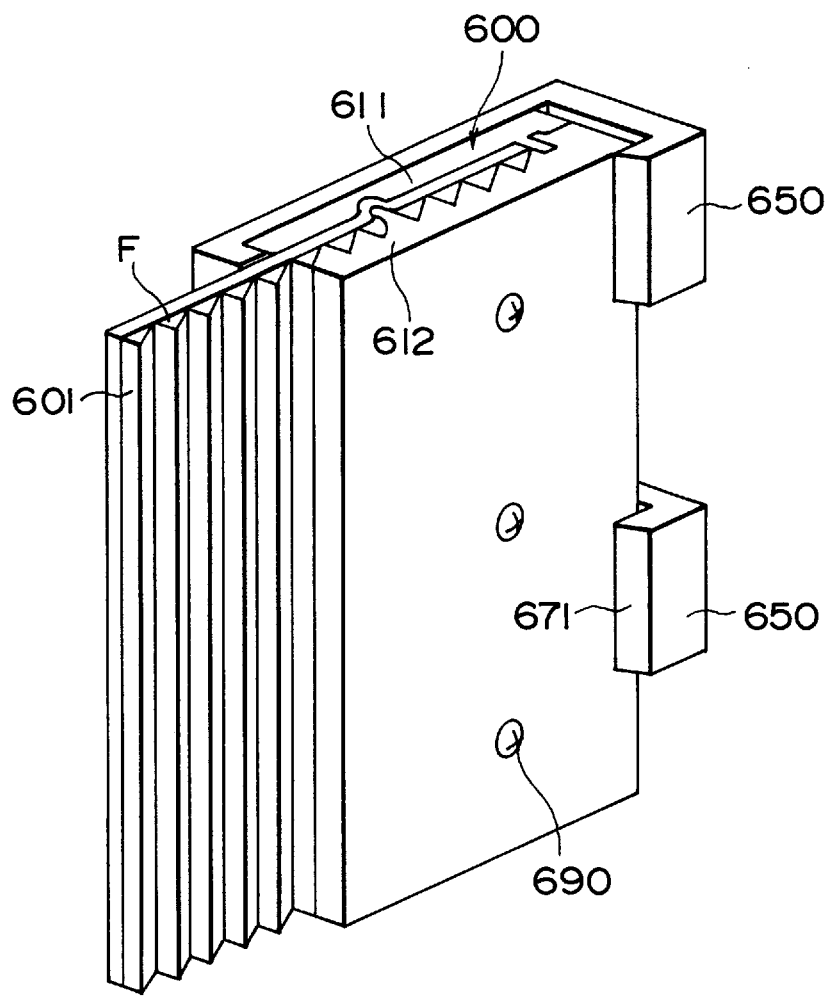
F I G. 27

FILM STRETCHING STRUCTURE

BACKGROUND OF THE INVENTION

1. Field of the Invention

The present invention relates to a film stretching structure having a frame capable of holding a non-self-supporting film or a sheet and, more particularly, to a film stretching structure for holding taut a film or a sheet serving as a television projection screen or the like.

2. Description of the Related Art

Most conventional Fresnel lenses to be used as a projection screen for a television set or the like are circular Fresnel lenses having a relatively thick, self-supporting sheet having a surface consisting of concentric circular lens sections. These conventional Fresnel lenses are produced by hot-pressing a thermoplastic resin or molding an ultraviolet setting resin (UV setting resin) in a molding die.

Also, conventional lenticular lenses to be used as a projection screen have a light entrance surface provided with linear lenticular elements and a light exit surface provided with a lens formed by alternately arranging black stripes. These conventional lenticular lenses are manufactured by the extrusion molding of a resin material or molding an UV setting resin in a molding die.

Recently, a lens film produced by forming lens sections in the surface of a thin film, such as Fresnel lenses and lenticular lenses, has been developed and put to practical use to meet necessity of reducing the thickness of the lens film to suppress the deterioration of picture quality due to optical loss caused by the lens film, and of producing the lens film continuously to improve the productivity.

For example, a linear Fresnel lens film is fabricated by a UV setting method which applies a UV setting resin in a predetermined shape on a continuous thin film by a coating machine resembling a gravure printing machine, and irradiates the applied UV setting resin with UV light to set the printed UV resin in the desired shape. When using thus fabricated scarcely self-supporting Fresnel lens film as a projection screen, the Fresnel lens film must be held taut. A first lens film holding method holds the Fresnel lens film by a rigid plate, such as a lenticular lens film. A second lens film holding method stretches the Fresnel lens film on a holding structure, such as a frame or a cabinet. In view of avoiding the creasing and slackening of the Fresnel lens film, of the productivity of the production line and of the possibility of further reduction of the thickness of the Fresnel lens film, the second lens film holding method is superior to the first lens film holding method. However, it is difficult for the second lens film holding method, which holds the Fresnel lens film taut on a holding structure, such as a frame or a cabinet, to keep the Fresnel lens film taut without forming creases therein. Furthermore, the second lens film holding method requires a knack for fastening the Fresnel lens film to the holding structure. Accordingly, it has been desired to enable the second lens film holding method to tension the Fresnel lens film continuously and to hold the Fresnel lens sheet by a simple method so that the Fresnel lens film may neither crease nor slacken.

There has been a demand for a film stretching structure of a simple construction not requiring any knack in stretching a Fresnel lens film thereon, and capable of securely and tautly holding a scarcely self-supporting, thin Fresnel lens film produced in a continuous web for use as a projection screen, without allowing the Fresnel lens film to crease or slacken, and of continuously tensioning the linear Fresnel lens film.

SUMMARY OF THE INVENTION

Accordingly, it is an object of the present invention to provide a film stretching structure of a relatively simple construction capable of securely and tautly holding a film, a sheet or the like for a projection screen without allowing the film or the sheet to crease or slacken and of continuously tensioning the film or the sheet.

According to the present invention, a film stretching structure for stretching a film comprises: a frame structure having a support surface for supporting a film to be stretched at its end edge portions; gap forming means for forming a gap in the support surface of the frame structure; stretching means, which is forced into the gap together with an end edge portion of the film placed on the surface of the frame structure so as to cover the gap; and holding means for securely holding the stretching means in place in the gap so that the film is pulled toward the gap and kept taut by the stretching means forced into the gap.

The frame structure may have an outer frame and an inner frame, which are combined so as to form the gap therebetween.

The stretching means may comprise a bar-shaped stretching member, and the stretching means holding means may comprise opposite end portions of the stretching members, and portions of the frame structure corresponding to the opposite ends of the gap, and provided with recesses formed so as to engage with the opposite ends of the stretching member, respectively.

The gap may be a groove formed in the surface of the frame structure, and the stretching means may comprise a bar-shaped stretching member to be fitted in the groove.

The gap may be a groove formed in the surface of the frame structure, the stretching means may be in the form of a stretching member to be fitted in the groove, and the holding means may comprise a fastening member capable of being detachably mounted on the frame structure, and formed integrally with the stretching member.

The frame structure may comprise an outer frame and an inner frame, which are put one upon the other, the gap may be a groove formed in a surface of the inner frame facing the outer frame, and the stretching means may comprise a stretching member to be pushed into the groove. The holding means is formed integrally with the outer frame, and the stretching means is placed on the outer frame.

The above and other objects, features and advantages of the present invention will become more apparent from the following description taken in connection with the accompanying drawings.

BRIEF DESCRIPTION OF THE DRAWINGS

FIG. 3(a) is a front view of a stretching member included in the film stretching structure of FIG. 1(a);

FIG. 3(b) is a sectional view taken on line 3B—3B in FIG. 3(a);

FIG. 3(c) is a sectional view similar to FIG. 3(b), showing the stretching member being pressed with a pressing tool;

FIGS. 4(a) to 4(c) are schematic views for assistance in explaining steps of a film stretching procedure for stretching a film on the film stretching structure of FIG. 1(a);

FIG. 5 is a fragmentary sectional view of the film stretching structure of FIG. 1(a), sowing a joint of the frame structure and the stretching member;

FIG. 8(a) is a fragmentary perspective view of a film stretching structure in a third embodiment according to the present invention;

FIG. 8(b) is a sectional view of a frame structure included in the film stretching structure of FIG. 8(a);

FIG. 8(c) is a sectional view of a stretching member included in the film stretching structure of FIG. 8(a);

FIGS. 12(a) and 12(b) are sectional views for assistance in explaining steps of pressing a stretching member into a groove;

FIG. 13(a) is a fragmentary perspective view of a film stretching structure in a fourth embodiment according to the present invention;

FIG. 13(b) is an enlarged view of a portion of FIG. 13(a);

FIGS. 14(a) to 14(c) are fragmentary sectional views of film stretching structures in fifth, sixth and seventh embodiments according to the present invention, respectively;

FIG. 15(a) is a plan view of an outer frame included in a film stretching structure in a eighth embodiment according to the present invention;

FIG. 15(b) is a plan view of an inner frame to be used in combination with the outer frame of FIG. 15(a);

FIG. 15(c) is a sectional view taken on line 15C—15C in FIG. 15(b);

FIGS. 16(a) to 16(c) are schematic views for assistance in explaining steps of a film stretching procedure using the film stretching structure of FIG. 15(d);

FIG. 18(a) is a plan view of a frame structure included in a film stretching structure in a ninth embodiment according to the present invention;

FIG. 18(b) is a sectional view taken on line 18B—18B in FIG. 18(a);

FIG. 23 is a sectional view of a film gripping unit included in a film stretching structure in a modification of the film stretching structure of FIG. 22(a);

FIG. 24 is a view for assistance in explaining a function of the film stretching structure of FIG. 23;

FIG. 25(a) is a sectional view of another modification of the film stretching structure of FIG. 22(a);

FIG. 25(b) is a view for assistance in explaining a function of the film stretching structure of FIG. 25(a);

FIG. 26 is a sectional view of a griping unit in a modification of the film gripping unit shown in FIG. 25(a);

FIG. 27 is a perspective view of the film gripping unit shown in FIG. 22(a) of the film stretching structure, held by holding members;

DESCRIPTION OF THE PREFERRED EMBODIMENTS

First Embodiment

Figure 1A:
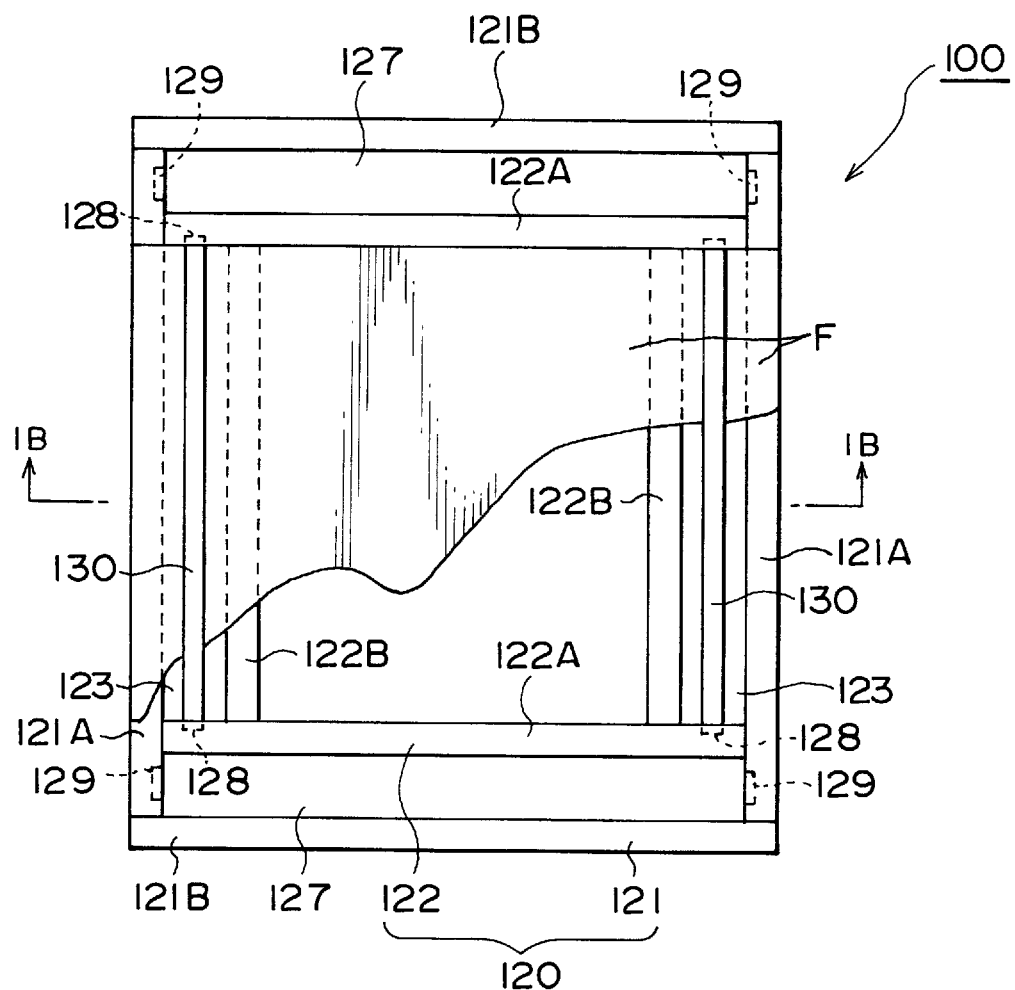
FIG. 1(a) is a plan view of a film stretching structure in a first embodiment according to the present invention.
Figure 1B:
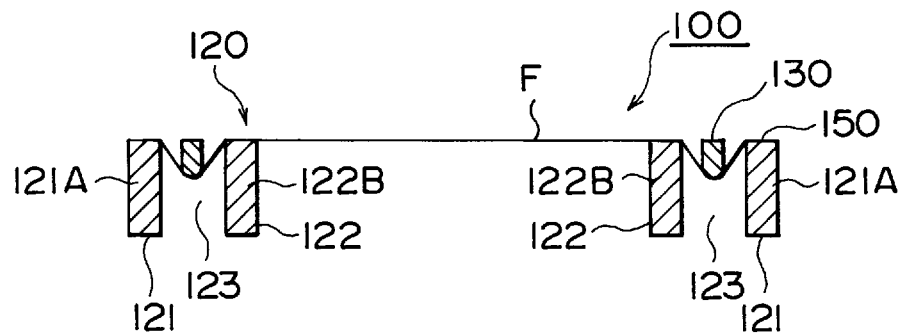
FIG. 1(b) is a sectional view taken on line 1B—1B in FIG. 1(a)
Figure 2:
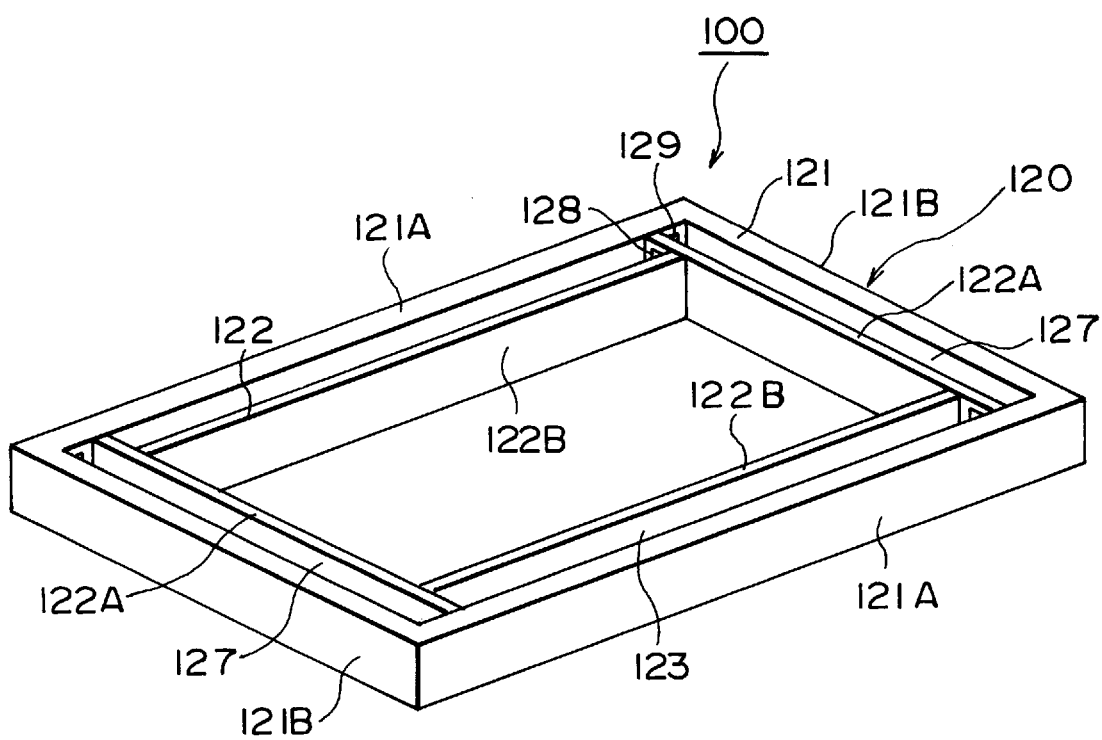
FIG. 2 is a perspective view of the film stretching structure of FIG. 1(a)

FIG. 1(a) is a plan view of a film stretching structure in a first embodiment according to the present invention in a state holding a film taut, FIG. 1(b) is a sectional view taken on line 1B—1B in FIG. 1(a) and FIG. 2 is a perspective view of the film stretching structure of FIG. 1(a).

Referring to FIGS. 1(a), 1(b) and 2, a film stretching structure generally indicated at 100 holds a non-self-supporting synthetic resin film or a sheet (hereinafter referred to as "film") F taut so that the film F may not crease or slacken. The film stretching structure 100 has a quadrangular frame structure 120. Although the film stretching structure in the first embodiment is intended to hold a television projection screen taut and to be attached to a cabinet of a television set or the like, the film stretching structure is not limited thereto in its practical application.

The frame structure 120 has a quadrangular outer frame 121 and a quadrangular inner frame 122 set inside the outer frame 121. The inner frame 122 has two parallel inner side members 122A laid between opposite outer side members 121A of the outer frame 121, and two parallel cross members 122B laid between the opposite end portions of the inner side members 122A, respectively. The opposite ends of the inner side members 122A are fixedly joined to the outer side members 121A, and the opposite ends of the cross members 122B are fixedly joined to the inner side members 122A.

Gaps 127 are formed between the opposite outer side members 121B of the outer frame 121 and the corresponding inner side members 122A of the inner frame 122, respectively. Gaps 123 are formed between the opposite outer side members 121A of the outer frame 121 and the corresponding cross members 122B of the inner frame 122, respectively. A bar-shaped stretching member 130 is fitted in each of the gaps 123. Recesses 128 are formed in the inner surfaces of portions of the inner side members 122A corresponding to the opposite longitudinal ends of each gap 123. Recesses 129 may be formed in the inner surfaces of portions of the opposite outer side members 121A corresponding to the opposite longitudinal ends of each gap 127 as shown in FIG. 2. The length of the bar-shaped stretching member 130 is substantially equal to the distance between the inner surfaces of the opposite cross members 122A. The components of the frame structure 120 are made of a rigid material, such as a steel or a resin material, such as polyvinyl chloride or an ABS resin or a phenolic resin, to hold the film F securely on the frame structure 120.

When stretching the film F on the film stretching structure 100 as shown in FIGS. 1(a) and 1(b), the film F may be attached to the outer frame 121 by any simple, suitable fastening means, such as heat-sealing or ultrasonic welding.

The stretching member 130 is pushed together with the film F placed on the outer frame 121 into the gap 123 of the frame structure 120 so as to stretch the film F on the outer frame 121. As shown in FIG. 3(a), each stretching member 130 is provided with projections 131 at its opposite ends, and each projection 131 has a curved contact surface 132 to be brought into contact with the film F. The projections 131 of the stretching member 130 have the curved contact surfaces 132 to enable the film F to be stretched in a satisfactorily taut state without creasing or slackening. The stretching member 130 has a convexly round working surface 133 to be brought into contact with the film F, and is provided with a longitudinal groove 134 in a surface opposite the convexly round working surface 133 as shown in FIG. 3(b). The stretching member 130 is pushed into the gap 123 by a pushing tool 136 applied to the bottom surface of the groove 134 as shown in FIG. 3(c). When the stretching members 130 are pushed into the gaps 123, pushing the film F into the gaps 123 as shown in FIG. 1(b), the projections 131 are fitted in the recesses 128 of the inner frame 122 to hold the film F taut on the outer frame 121. Preferably, the stretching members 130 are made of a not very elastic material, such as an acrylic resin or a metal.

A film stretching procedure for stretching the film F on the film stretching structure 100 will briefly be described with reference to FIGS. 4(a) to 4(c), which are similar to FIG. 1(b).

First, the opposite end portions 150 of the film F are attached to the outer side members 121A of the outer frame 121 as shown in FIG. 4(a). The length of the film F, i.e., the distance between the opposite end portions 150, are determined so that the film F can properly be tensioned when stretched. Then, the stretching members 130 is pushed into the gaps 123, pushing the end portion of the film F into the gaps 123 as shown in FIG. 4(b) by using the pushing tools 136 fitting the grooves 134 of the stretching members 130 as shown in FIG. 3(c)

As mentioned above, the means for fastening the film F to the outer frame 121 is not limited to heat-sealing. Although the end portions 150 of the film F are attached to the film supporting surface in this embodiment, the end portions 150 may be attached to the outer side surfaces of the outer side members 121A of the outer frame 121.

As the stretching members 130 are pushed into the gaps 123 in the directions of the arrows B indicated in FIG. 4(b), the film F is pulled in the directions of the arrows A indicated in FIG. 4(b). Finally, the projections 131 formed at the opposite ends of the stretching members 130 are fitted in the recesses 128 formed in the inner side members of the inner frame 122 as shown in FIG. 5 to complete the film stretching procedure.

Thus, the film F is stretched in a taut state with respect to horizontal directions as viewed in FIG. 1(a). The film F can be stretched in a taut state with respect to vertical directions as viewed in FIG. 1(a) by fastening the film F to the outer side members 121B of the outer frame 121, and pushing stretching members similar to the stretching members 130 into the gaps 127 so that the opposite ends thereof are fitted in the recesses 129.

Second Embodiment

Figure 6A:
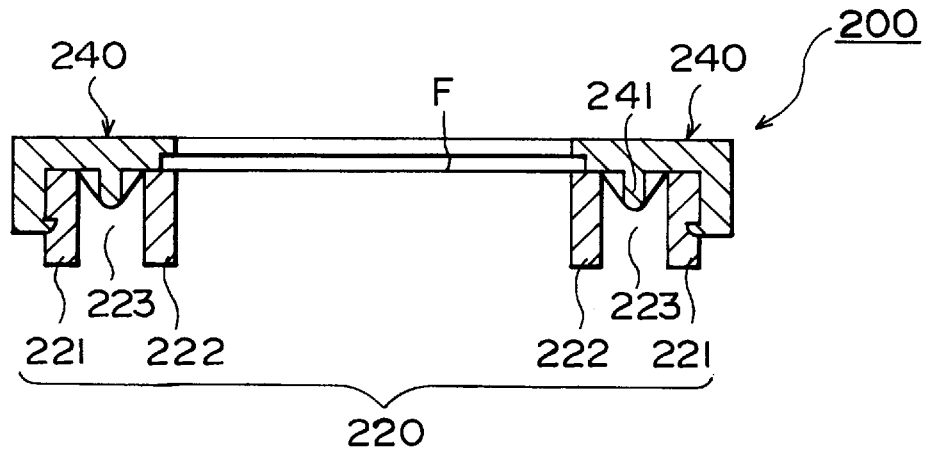
FIGS. 6(a) and 6(b) are sectional views of a film stretching structure in a second embodiment according to the present invention.
Figure 6B:
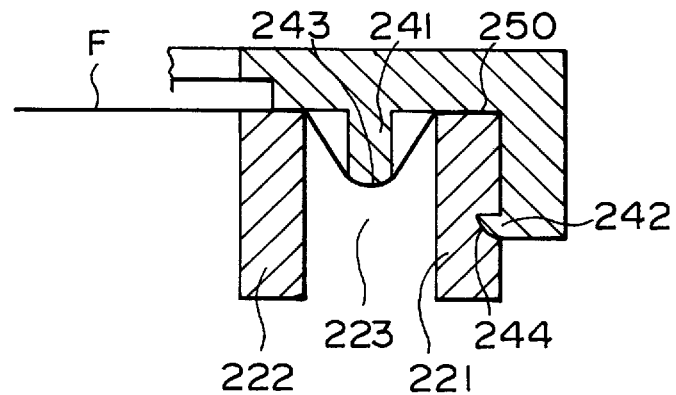

FIG. 6(a) is a sectional view of a film stretching structure in a second embodiment according to the present invention, and FIG. 6(b) is an enlarged sectional view of a portion of FIG. 6(a).

Shown in FIGS. 6(a) and 6(b) are a film stretching frame structure 200, a film F, a frame structure 220, an outer frame 221, and an inner frame 222. Gaps 223 are formed between the outer frame 221 and the inner frame 222. Stretching-and-covering members 240 correspond in function to the stretching members 130 of the first embodiment. Each of the stretching-and-covering members 240 has a cross section resembling the letter L, and has a horizontal section and a vertical section formed integrally with the horizontal section, as viewed in FIGS. 6(a) and 6(b). A stretching ridge 241 is formed on the lower surface of the horizontal leg of the stretching-and-covering member 240 integrally with the horizontal section. The stretching ridge 241 has a convexly curved contact surface 243. The. vertical section is provided at the lower end of its inner surface with a holding ridge 242. Opposite end portions 250 of the film F are attached to the upper surfaces, as viewed in FIGS. 6(a) and 6(b), of the side members of the outer frame 221. A groove 244 is formed in the outer side surface of the outer side member of the outer frame 221, and the holding ridge 242 of the stretching member 240 are brought into snapping engagement with the grooves 244.

The frame structure 220 of the second embodiment is similar to that of the first embodiment. The film F is attached to the pair of opposite outer side frame members of the outer frame 221 by heat-sealing, the stretching ridges 241 of the stretching members 240 are pushed into the gaps 223 so that the film F is stretched. The stretching-and-covering members 240 covers the outer and the inner side members of the frame structure 220 to give an improved appearance to the film stretching structure 200. The stretching ridges 241 of the stretching-and-covering members 240 can easily be pushed into the gaps 223 without using any pushing tool like that employed in stretching the film F by the film stretching structure 100 in the first embodiment, and is capable of holding the film F taut.

Referring to FIG. 6(b), the stretching-and-covering member 240 is held on the outer side member of the outer frame 221 with the holding ridge 242 in engagement with the recess 244 to hold the film F taut with the stretching ridge.

A film stretching procedure for stretching the film F on the film stretching structure 200 will briefly be described with reference to FIGS. 7(a) to 7(d).

Figure 7A:
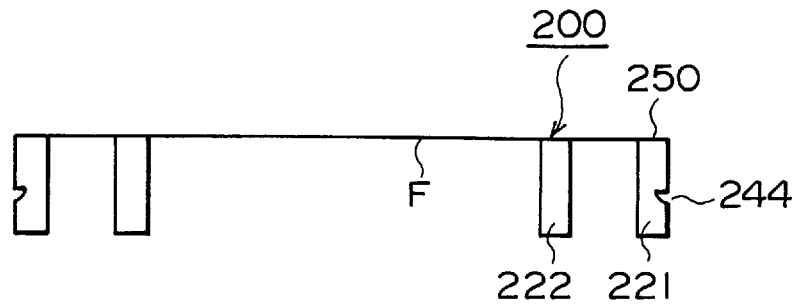
FIGS. 7(a) to 7(d) are schematic views for assistance in explaining steps of a film stretching procedure for stretching a film on the film stretching structure of FIG. 6(a)
Figure 7B:
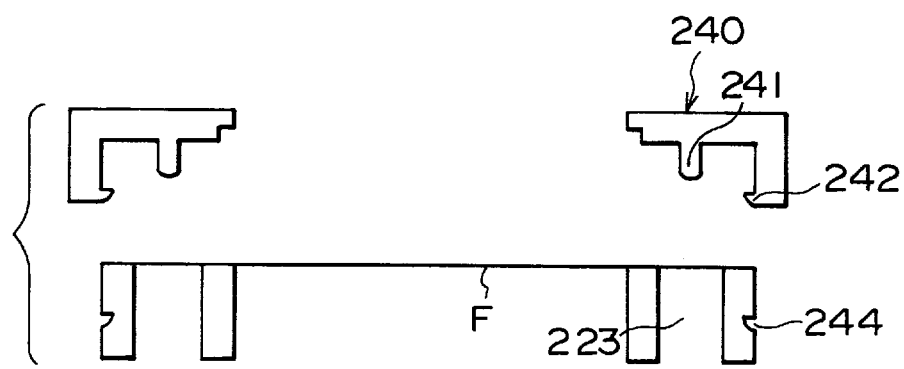
Figure 7C:
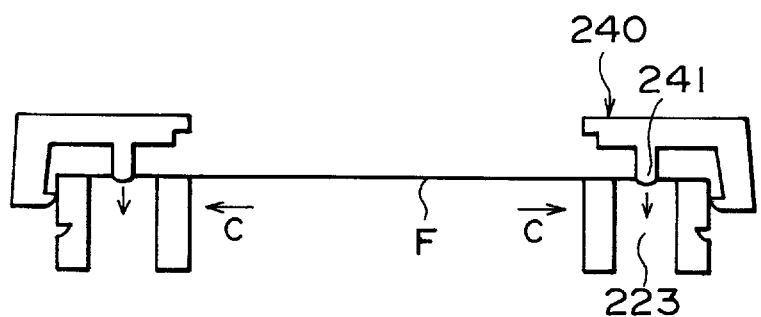
Figure 7D:
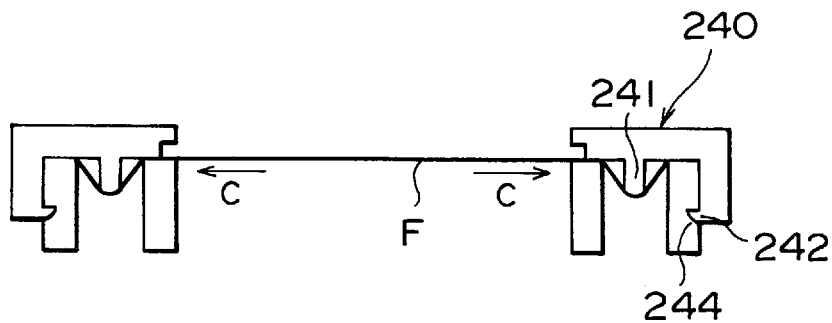

The opposite end portions 250 of the film F are attached to the outer side members of the outer frame 221. as shown in FIG. 7(a). The film F has a length, i.e., the distance between the edges of the opposite end portions; 250, suitable for properly stretching the film F. The stretching-andcovering members 240 are disposed at predetermined positions corresponding to the outer side members of the outer frame 221 as shown in FIG. 7(b), the film F is attached to the outer side members of the outer frame 221 by heat-sealing or the like, and then the stretching-and-covering members 240 are depressed to push the stretching ridges 241 of the stretching-and-covering members 240 into the gaps 223 so as to push portions of the film F into the gaps 223 as shown in FIG. 7(c). As mentioned above, the end portions 250 of the film F may be attached to the outer side members of the outer frame 221 by any suitable means other than heat-sealing. Although the end portions 250 of the film F are attached to the film supporting surface in this embodiment, the end portions 250 may be attached to the outer side surfaces of the outer side members of the outer frame 121. As the stretching ridges 241 of the stretching-and-covering members 240 are pushed into the gaps 223 in the directions of the arrows, the film F is pulled in the directions of the arrows C indicated in FIGS. 7(c) and 7(d). Finally, the holding ridges 242 formed at the lower ends of the vertical legs of the stretching-and-covering members 240 come into engagement with the recesses 244 of the outer frame 221 as shown in FIG. 7(d) to complete the film stretching procedure.

A panel, such as a front panel or an antireflection panel, may be interposed between the stretching-and-covering members 240 and the inner frame 222 to improve the quality of appearance. The stretching members 240 of the film stretching structure 200 give an improved appearance to the film stretching structure 200. The film stretching structure 200 in the second embodiment is simple in construction and is capable of surely holding the film F taut. This film stretching structure 200 is applicable to holding of a large film or a screen consisting of a plurality of films or sheets. The film stretching structure 200 is particularly suitable for holding taut a non-self-supporting thin film or sheet to be used as a television projection screen.

Third Embodiment

A film stretching structure in a third embodiment according to the present invention is indicated generally at 300 in FIG. 8(a). The film stretching structure 300 has a quadrangular frame 301 provided in its surface with a quadrangular groove 302 of a substantially circular cross section, and a bar-shaped stretching-and-clamping member 303 to be fitted in the groove 302. The groove 302 has a narrow opening as shown in FIG. 8(b). The stretching-and-clamping member 303 is made of an elastic material which yields to a force above a certain level of force, such as a hard rubber. Preferably, the stretching-and-clamping member 303 has a cross section slightly greater than that of the groove 302.

When stretching a film F on the film stretching structure 300, the film F is attached to the surface of the quadrangular frame 301, provided with the groove 302, and then the stretching-and-clamping member 303 is forced into the groove 302 as shown in FIG. 8(a), so that a portion of the film F surrounded by the groove 302 is stretched.

Figure 9A:
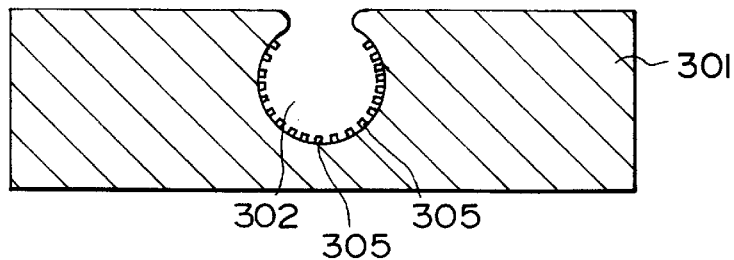
FIG. 9(a) is a sectional view of a frame structure in a modification.
Figure 9B:
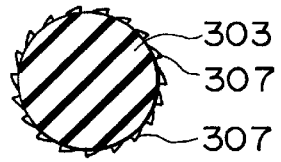
FIG. 9(b) is a sectional view of a stretching member in a modification.

Minute projections 305 may be formed in the surface of the groove 302 as shown in FIG. 9(a) for a further reliable stretching and holding of the film F. If the film F is provided in its surface with ridges and furrows, the stretching-and-clamping member 303 may be provided in its surface with sawtooth ridges 307 which engages with the furrows of the film F as shown in FIG. 9(b) for a further reliable stretching and holding of the film F. If the groove 302 of the frame 301 is provided in its surface with ridges and furrows, and the stretching-and-clamping member 303 to be forced into the groove 302 is provided in its surface with ridges and furrows mating with those of the groove 302, the stretching-and-clamping member 303 can surely be secured in the groove 302 and, consequently, the film F can surely be stretched and held.

Figure 10A:
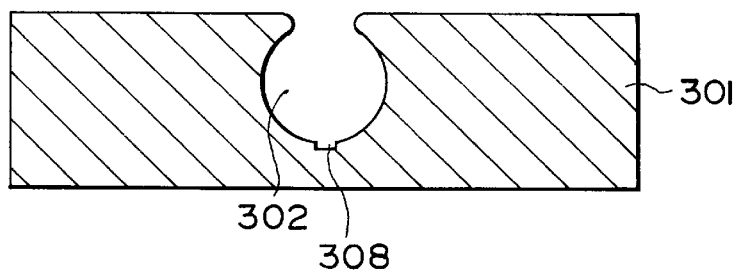
FIG. 10(a) is a sectional view of a frame structure in another modification.
Figure 10B:
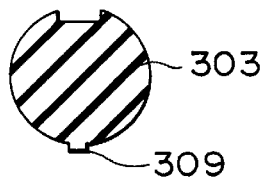
FIG. 10(b) is a sectional view of a stretching member in another modification.

For example, a groove 308 of a rectangular cross, section may be formed in the bottom of the groove 302 as shown in FIG. 10(a), and a ridge 309 of a rectangular cross section mating with the groove 308 may be formed on the stretching-and-clamping member 303 as shown in FIG. 10(b).

Figure 11A:
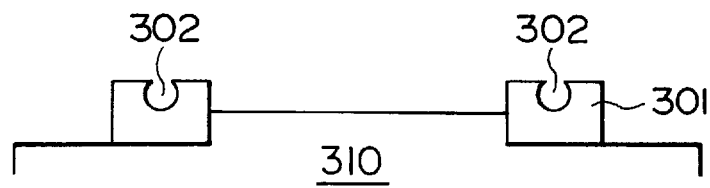
FIGS. 11(a) to 11(d) are schematic views for assistance in explaining steps of a film stretching procedure using the film stretching structure of FIG. 8(a)
Figure 11B:
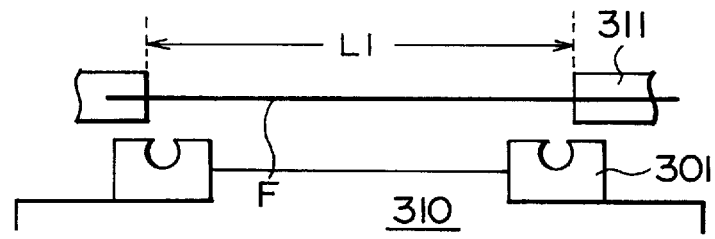
Figure 11C:
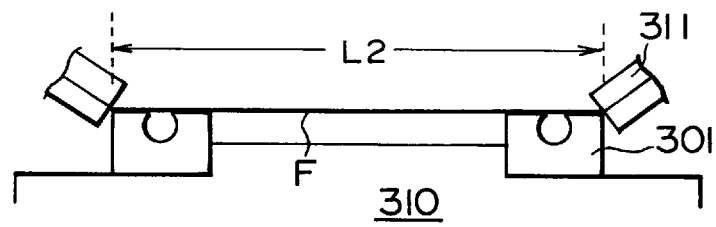
Figure 11D:
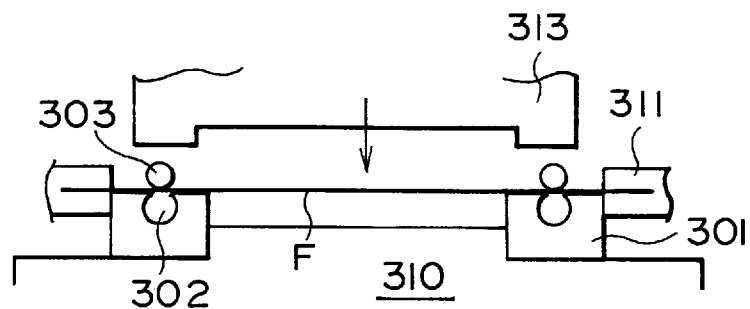

FIGS. 11(a) to 11(d) are schematic views for assistance in explaining steps of a film stretching procedure using the film stretching structure 300 of FIG. 8(a). First, the frame 301 is supported fixedly on a stage 310 as shown in FIG. 11(a). Subsequently, the film F held at its end edges by film holders 311 is disposed above the frame 301 as shown in FIG. 11(b), and then the film holders 311 are lowered and then tilted to bring the film F into contact with the surface of the frame 301 as shown in FIG. 11(c). While the film holders 311 are lowered from a position shown in FIG. 11(b) to a position shown in FIG. 11(c), the interval between the film holders 311 is increased from $L_1$ to $L_2$ to stretch the film F. Eventually, the film holders 311 are moved to positions shown in FIG. 11(d). After the film F has been held in a state shown in FIG. 11(d), the stretching-and-clamping member 303 is pressed into the groove 302 by a press machine 313 to hold the film F taut on the film stretching structure 300.

The stretching-and-clamping member 303 is distorted as shown in FIGS. 12(a) and 12(b) when the same is pressed into the groove 302. At an initial stage of pressing the stretching-and-clamping member 303 into the groove 302, the stretching-and-clamping member 303 is distorted in a shape shown in FIG. 12(a). After the stretching-and-clamping member 303 has completely been pressed into the groove 302, a contractile force of the film F acts in the direction of the arrow D, whereby a pressure indicated by the arrows E is exerted on the stretching-and-clamping member 303.

Fourth Embodiment

FIG. 13(a) shows a film stretching structure in a fourth embodiment according to the present invention generally indicated at 300X, and FIG. 13(b) shows a fastening member 320 included in the film stretching structure 300X. As shown in FIG. 13(b), the fastening member 320 has, in an integral construction, a horizontal section 320A, a vertical section 320B and a flange 320C. The horizontal section 320A is provided on its back surface with a pushing ridge 321. A concave curved surface opening obliquely downward and rightward, as viewed in FIG. 13(b) is formed in the edge 322 of the pushing ridge 321.

As shown in FIG. 13(a), the fastening member 320 is put on a frame 301 with its horizontal section 320A overlying the upper surface of the frame 301 and with the vertical section 320B in contact with the outer side surface of the frame 301, and is fastened to the frame 301 with screws 324. In this state, the pushing ridge 321 applies a pressure to a stretching-and-clamping member 303 pressed into a groove 302 formed in the upper surface of the frame 301. The concave curved surface 322 formed in the edge of the pushing ridge 321 is able to be in firm contact with the stretching-and-clamping member 303 to hold the stretching-and-clamping member 303 securely in place in the groove 302.

In this embodiment, a film F stretched on the film stretching structure 300X is a linear Fresnel lens film. Corner portions of the film F are secured to the frame 301 by corner fastening members 325 fastened to the frame 301 with screws. The corner fastening members 325 are substantially the same in construction as the fastening members 320.

Fifth, Sixth and Seventh Embodiments

FIGS. 14(a) to 14(c) are fragmentary sectional views of film stretching structures in fifth, sixth and seventh embodiments according to the present invention, respectively.

The film stretching structures in the fifth, the sixth and the seventh embodiment are substantially the same in construction as the film stretching structure 300X in the fourth embodiment shown in FIG. 13(a), except that the film stretching structures in the fifth, the sixth and the seventh embodiment have a stretching-and-clamping member corresponding to an integral combination of the fastening member 320 and the stretching-and-clamping member 303 of the film stretching structure 300X in the fourth embodiment.

Referring to FIG. 14(a), a stretching-and-clamping member 320 of the fifth embodiment has a fastening portion having a horizontal section 320A overlying the upper surface of a frame 301 provided with a groove 302, and a stretching portion 322 formed integrally with the fastening portion so as to project from the back surface of the horizontal section 320A. The stretching portion 322 has two lips, and has a generally circular cross section conforming to the circular cross section of the groove 302. The stretching portion 322 holds an edge portion of the film F in the groove 302.

Referring to FIG. 14(b), a stretching-and-clamping member 320 of the sixth embodiment has a fastening portion having a horizontal section 320A overlying the upper surface of a frame 301 provided with a groove 302, and a stretching portion 322 formed integrally with the fastening portion so as to project from the back surface of the horizontal section 320A. The groove 302 has a basically quadrangular cross section, and a ridge 324 is formed on an inner side surface on the inner side of the frame 301. The stretching portion 322 has two lips. The lip 322A on the side of the inner side surface having the ridge 324 has a shape conforming to the inner side surface of the groove 302, and is provided at its edge with a rib 326 which engages with the lower side of the ridge 324 to make the stretching portion 322 difficult to be pulled out of the groove 302.

Referring to FIG. 14(c), a stretching-and-clamping member 320 of the seventh embodiment has a fastening portion having a horizontal section 320A overlying the upper surface of a frame 301 provided with a groove 302, and a stretching portion 322 formed integrally with the fastening portion so as to project from the back surface of the horizontal section 320A. The groove 302 has trapezoidal cross section expanding outward, and the stretching portion 322 has a cross section conforming to that of the groove 302. The stretching-and-clamping member 320 must be fastened to the frame 301 with screws because the stretching portion 322 is liable to slip out of the groove 302.

Eighth Embodiment

Figure 15D:
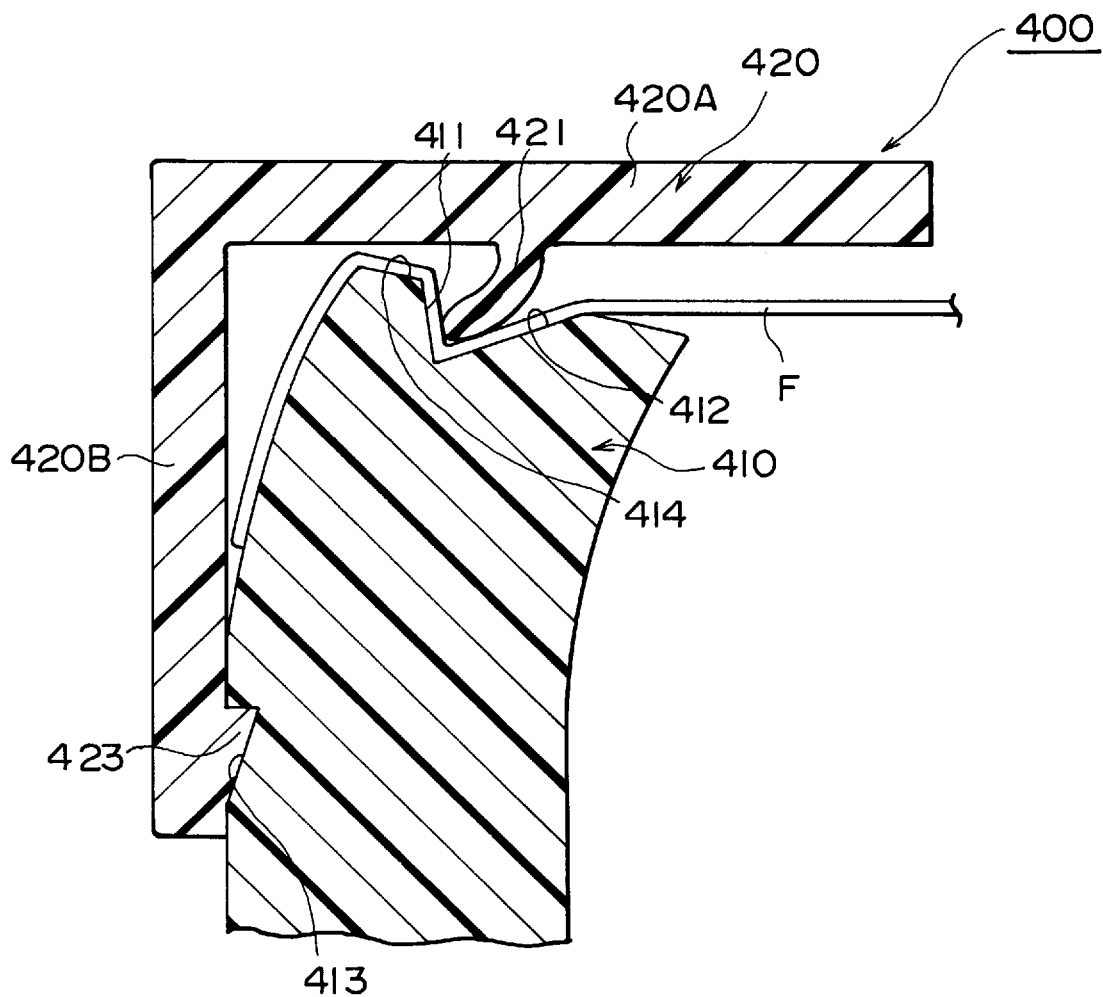
FIG. 15(d) is a fragmentary sectional view of a film stretching structure constructed by assembling the component parts of FIGS. 15(a) to 15(c)

A film stretching structure 400 in an eighth embodiment according to the present invention will be described with reference to FIGS. 15(a) to 15(d). The film stretching structure 400 has a quadrangular outer frame 420 (FIG. 15(a)), and a quadrangular inner frame 410 (FIG. 15(b)). The inner frame 410 is fastened to a cabinet or the line. As shown in FIG. 15(c) in a sectional view taken on line 15C—15C in FIG. 15(b), the side walls of the inner frame 410 are curved so that the inner frame 410 narrows upward, as viewed in FIG. 15(c), and a groove 411 of a V-shaped cross section having inclined surfaces 412 is formed in the upper surface, as viewed in FIG. 15(c), of the inner frame 410. A holding groove 413 of a substantially V-shaped cross section is formed in the side surfaces of the inner frame 410 in parallel to the groove 411.

As shown in FIG. 15(d), the outer frame 420 has a horizontal section 420A in a horizontal position, as viewed in FIG. 15(d), and a vertical section 420B in a vertical position, as viewed in FIG. 15(d), and has an L-shaped cross section. A stretching projection 421 is formed integrally with the horizontal section 420A so as to project from the back surface of the latter. The stretching projection 421 is brought into engagement with the groove 411 of the inner frame 410. A holding ridge 423 is formed on the inner surface of the vertical section 420B in a portion near the lower edge. The holding ridge 423 is brought into snapping engagement with the groove 413 of the inner frame 410.

The outer inclined surface 412 of the groove 411 is inclined at a larger inclination, and the inner inclined surface 412 of the same is inclined at a smaller inclination. A top surface 414 on the outer side of the groove 411 is on the highest level.

The outer frame 420 may be an integral structure made of a polypropylene resin or may be a composite structure consisting of a main portion, i.e., a portion consisting of the horizontal section 420A and the vertical section 420B, made of an ABS resin, and the stretching projection 421 made of a butadiene resin. The inner frame 410 may be made of a polypropylene resin, a polyvinyl chloride resin or the like.

FIGS. 16(a) to 16(c) are schematic views for assistance in explaining steps of a film stretching procedure using the film stretching structure 400. First, as shown in FIG. 16(a), edge portions $F_a$ of a film F are bent so as to extend along the outer surface of an upper portion of the inner frame 410, and then the outer frame 420 is moved toward the inner frame 410 to bring the stretching projections 421 into contact with the surface of the film F as shown in FIG. 16(b). The outer frame 420 is advanced further toward the inner frame 410. Consequently, the stretching projections 421 are guided by the inner inclined surfaces 412 of the grooves 11, inclined at the smaller inclination, and are bent outward to stretch the film F as shown in FIG. 16(c). In a state shown in FIG. 16(c), the holding ridge 423 of the outer frame 420 is snappingly pressed into the groove 413 of the inner frame 410, so that the outer frame 420 is secured to the inner frame 410 and the stretching projections 421 stretch the film F and hold the edge portions $F_a$ of the film F in the grooves 411.

Figure 17A:
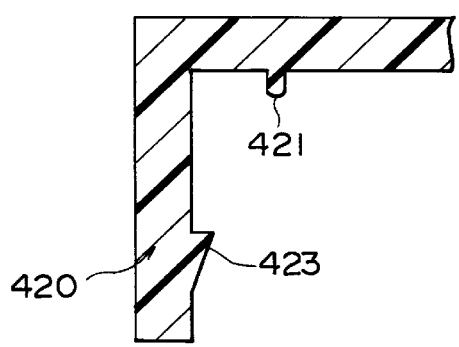
FIGS. 17(a) and 17(b) are sectional views of component parts employed in a modification of the film stretching structure of FIG. 15(d)
Figure 17B:
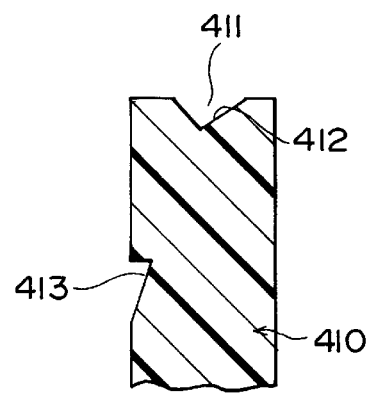

FIGS. 17(a) and 17(b) are sectional views of an outer frame 420 and an inner frame 410 employed in a modification of the film stretching structure in the eighth embodiment, respectively. As shown in FIG. 17(b), the inner frame 410 has straight side walls instead of the curved side walls, and the outer frame 420 is the same as the outer frame 420 shown in FIG. 15(d).

Ninth Embodiment

Figure 18C:
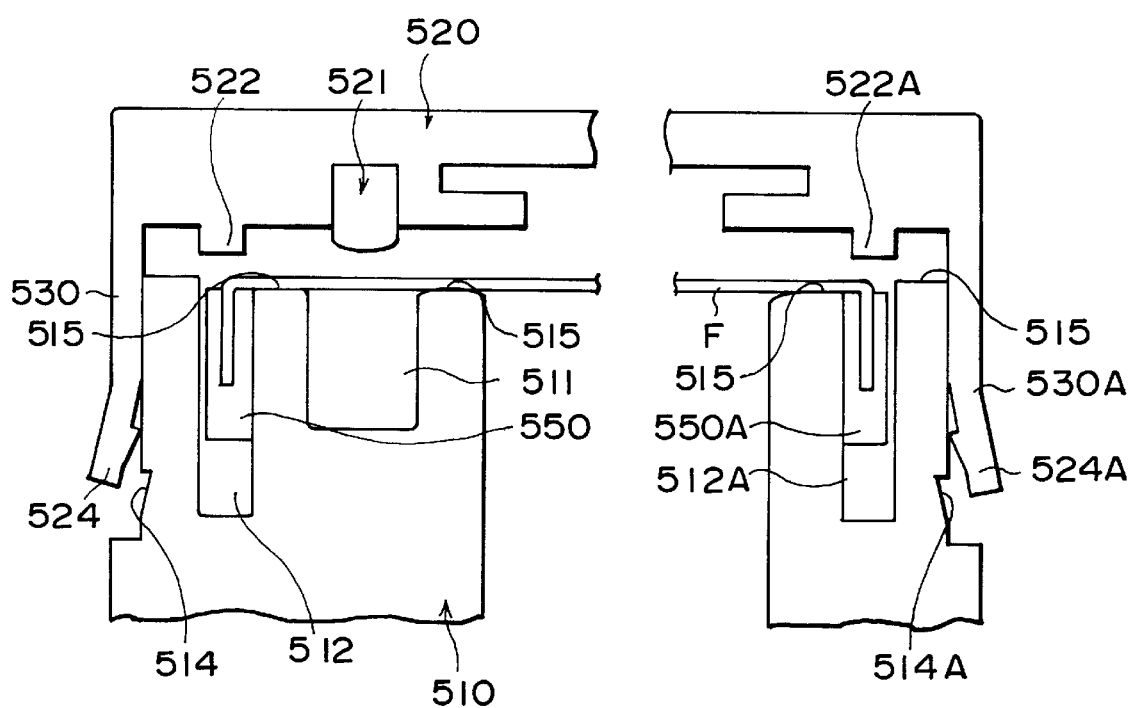
FIG. 18(c) is a sectional view, similar to FIG. 18(b), in a state immediately before a state shown in FIG. 18(b)

FIGS. 18(a) to 18(c) illustrate a film stretching structure 500 in a ninth embodiment according to the present invention. As shown in FIG. 18(b) in a sectional view taken on line 15B—15B in FIG. 15(a), the film stretching structure 500 has a frame structure including a quadrangular inner frame 510 and a quadrangular outer frame 520. The inner frame 510 has a right-hand side member and a left-hand side member. The width of the left-hand side member, as viewed in FIG. 18(b), is greater than that of the right-hand side member. Preferably, the outer frame 520 is made of a relatively hard material, such as a polypropylene resin, a polyvinyl chloride resin or the like. Preferably, the inner frame 510 is made of a material which is hard to distort by a relatively large force, such as an ABS resin, a phenolic resin or the like.

The outer frame 520 is provided in its surface facing the inner frame 510 with a stretching member 521 of a hard rubber projecting toward the inner frame 510. The stretching member 521 is fixedly fitted in a groove formed in the surface of the outer frame 520 facing the inner frame 510. The outer frame 520 is provided on a surface facing the inner frame 510 of a side member corresponding to the left-hand side member of the inner frame 510 with a first ridge 522 in a portion thereof on the outer side of the stretching member 521, and on a surface facing the inner frame 510 of a side member corresponding to the right-hand side member of the inner frame 510 with a second ridge 522A. Preferably, the length of projection from the surface of the outer frame 520 of the stretching member 521 is smaller than those of the first ridge 522 and the second ridge 522A. Vertical sections 530 and 530A are formed at the outer edges of the opposite side members of the outer frame 520, respectively. The vertical sections 530 and 530A are provided in portions of the inner surfaces thereof near the lower ends thereof with holding ridges 524 and 524A, respectively.

The inner frame 510 is provided in the surface facing the outer frame 520 of the left-hand side member with a first groove 511 at a position corresponding to the stretching member 521 attached to the outer frame 520. The width of the first groove 511 is greater than the width of the stretching member 521. A second groove 512 is formed in the left-hand side member on the outer side of the first groove 511 in parallel to the latter at a position corresponding to the first ridge 522. A third groove 512A is formed in the surface facing the outer frame 520 of the right-hand side member of the inner frame 510 at a position corresponding to the second ridge 522A of the outer frame 510.

Referring to FIG. 18(c), when stretching a film F on the film stretching structure 500, film holders 550 and 550A attached to the opposite end edges of the film F are inserted in the second groove 512 and the third groove 512A to stretch the film F lightly on the inner frame 510. In this state, the stretching member 521, the first ridge 522 and the second ridge 522A of the outer frame 520 are not in contact with the film F, and the inner surfaces of the vertical sections 530 and 530A are in sliding contact with the outer side surfaces of the left-hand and the right-hand side member of the inner frame 510, respectively. In this state, the film F has some creases and some slack portions. Thereafter, the outer frame 520 is advanced toward the inner frame 510. Then, the first ridge 522 and the second ridge 522A first come into contact with the film F and, subsequently, the stretching member 521 comes into contact with the film F. The first ridge 522 and the second ridge 522A depress the film holders 550 and 550A to restrain the edge portions of the film F from moving, and then the stretching member 521 pushes a portion of the film F into the first groove 511 to stretch the film F. As the outer frame 520 is advanced further toward the inner frame 510, the film holders 550 and 550A are depressed further toward the bottom of the corresponding grooves 512 and 512A. Finally, the outer frame 520 comes into contact with the upper surface 515 of the inner frame 510, whereby the film F is held taut between the inner frame 510 and the outer frame 520 as shown in FIG. 18(b).

The film stretching structure 500 in the ninth embodiment pulls the film F in one direction for stretching. A film stretching structure in a modification of the film stretching structure 500 may have an inner frame having a right-hand side member and a left-hand side member of the same shape as that of the left-hand side member of the inner frame 510 of the film stretching structure 500, and an outer frame having a right-hand side member and a left-hand side member of the same construction as that of the left-hand side member of the outer frame 520 of the film stretching structure 500 to pull the film F in opposite directions for stretching.

Figure 19A:
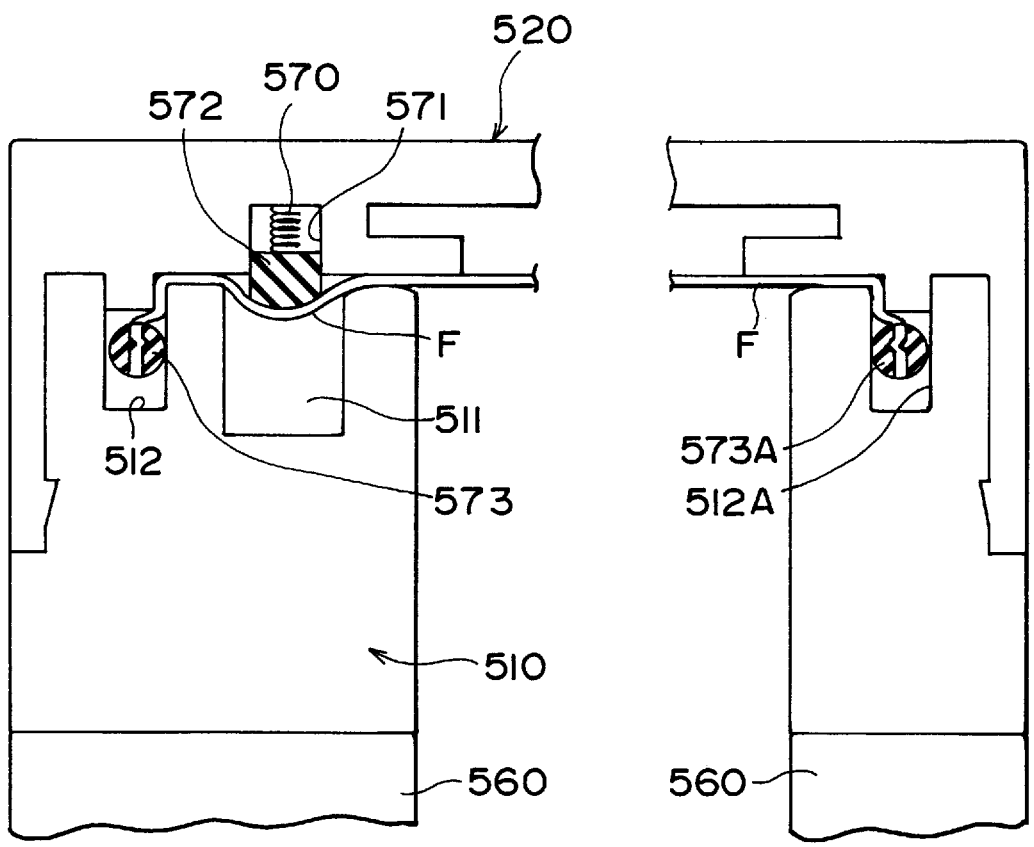
FIG. 19(a) is a sectional view of a film stretching structure in a modification of the film stretching structure in the ninth embodiment shown in FIG. 18(b)
Figure 19B:
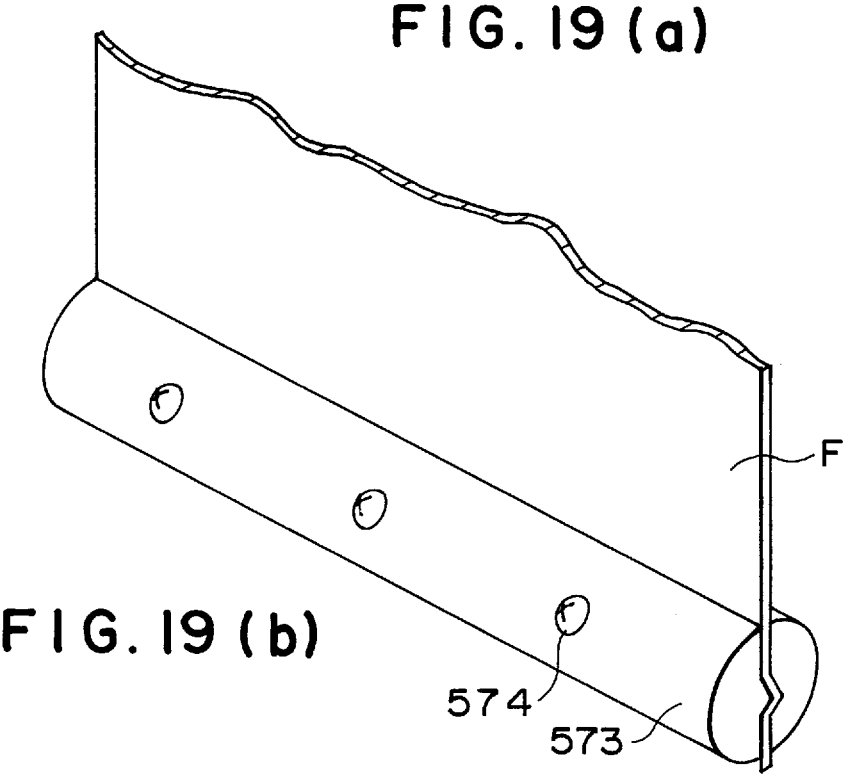
FIG. 19(b) is an enlarged perspective view of a portion of FIG. 19(a)

FIG. 19(a) shows a film stretching structure in a modification of the film stretching structure of FIG. 18(b). As shown in FIG. 19(a), a stretching member 572 is slidably fitted in a groove 571 formed in a surface of an outer frame 520, facing an inner frame 510, and is biased outward of the groove 571 by a spring 570. Each of film holders 573 and 573A have a pair of semicylindrical members. Each end edge of a film F is nipped between the pair of semicylinderical members fastened together with screws 574 as shown in FIG. 19(b). The film stretching structure shown in FIG. 19(a) is the same in other respects as that shown in FIG. 18(b). The spring constant of the spring 570 is selectively determined to apply a desired resilient force to the film F with the stretching member 572.

Figure 20:
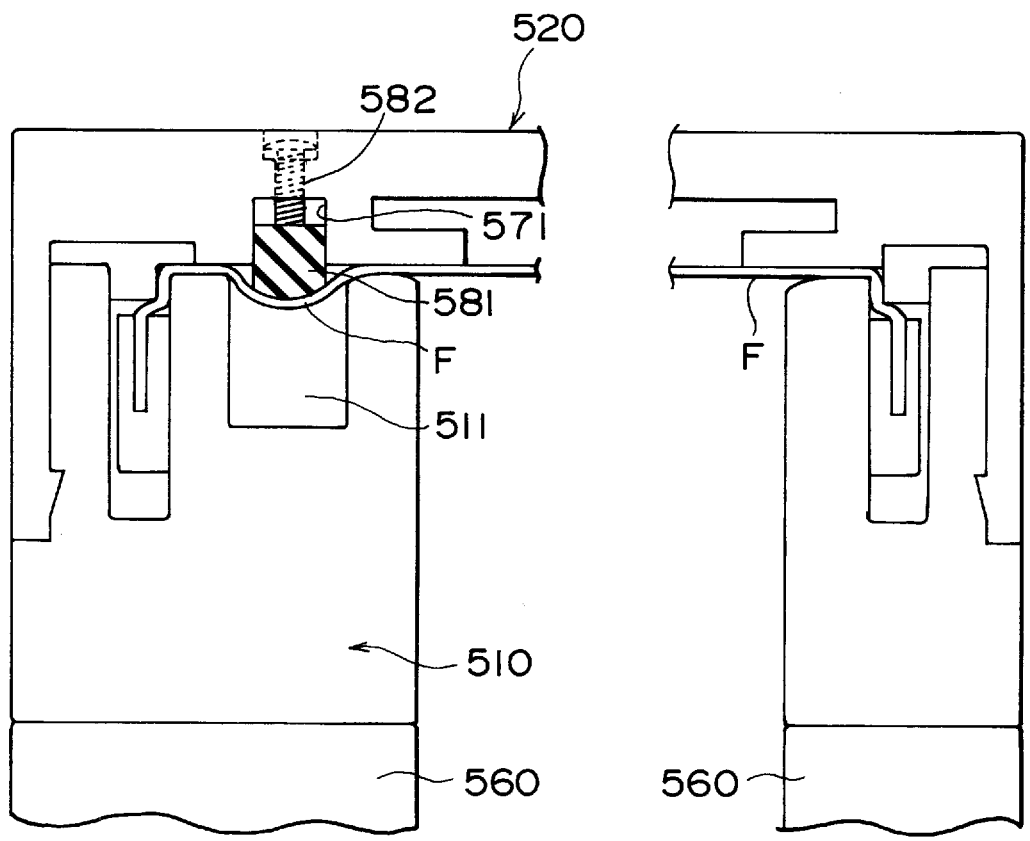
FIG. 20 is a sectional view of a film stretching structure in another modification of the film stretching structure in the ninth embodiment shown in FIG. 18(b)

A film stretching structure shown in FIG. 20 in another modification of the film stretching structure in the ninth embodiment shown in FIG. 18(b) employs an adjusting screw 582 instead of the spring 570 employed in the foregoing modification shown in FIG. 19(a). The length of a portion of a stretching member 581 projecting from a groove 571 formed in a surface of an outer frame 520, facing an inner frame 510 is adjusted the tautness of a film F held taut on the film stretching structure. The film stretching structure in this modification is the same in other respects as that shown in FIG. 18(b).

Figure 21:
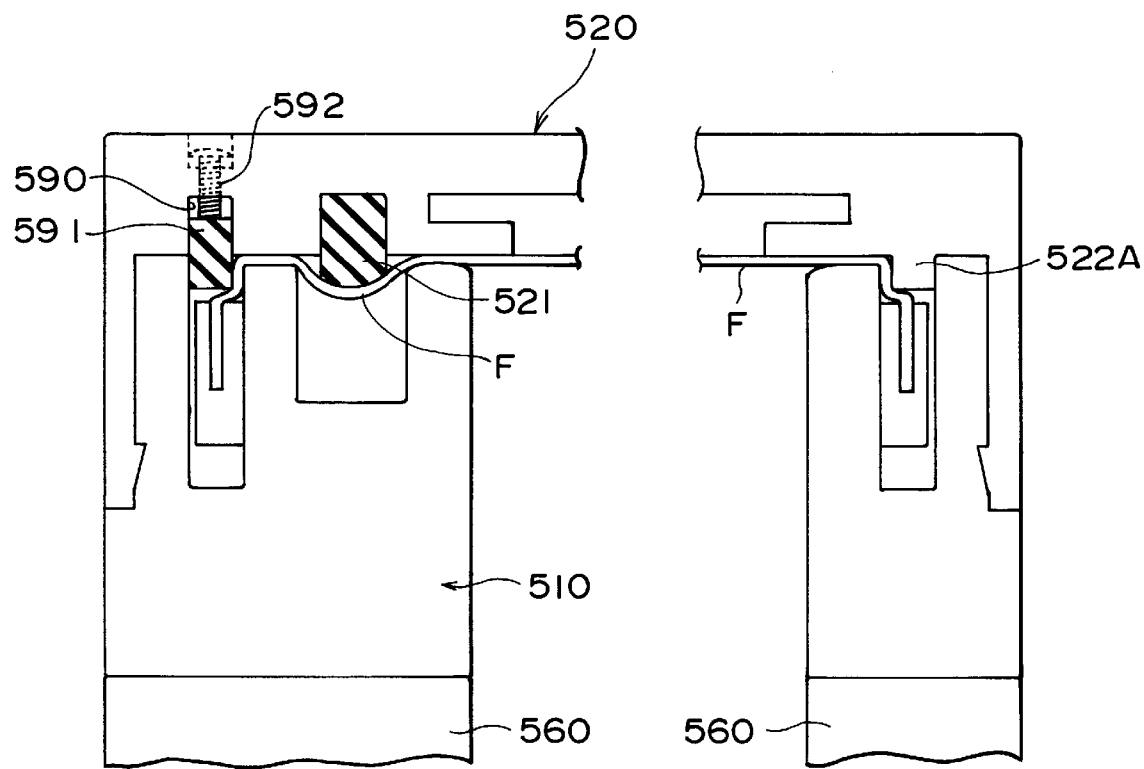
FIG. 21 is a sectional view of a film stretching structure in a third modification of the film stretching structure of FIG. 18(b)

A film stretching structure shown in FIG. 21 in a third modification of the film stretching structure of FIG. 18(b) employs the same stretching member 521 as that employed in the film stretching structure shown in FIG. 18(b), and employs a holding member 591 and an adjusting screw 592 instead of the first ridge 522. The holding member 591 is slidably fitted in a groove 590 formed in a surface of an outer frame 520, facing an inner frame 510, and the length of a portion of the holding member 591 projecting from the groove 590 is adjusted by the adjusting screw 592 to deal with various stretching conditions. A second ridge 522A formed on the other side member of the outer frame 520 may be replaced with a combination of a holding member, an adjusting screw and a groove for receiving the holding member similar to the holding member 591, the adjusting screw 592 and the groove 590.

Tenth Embodiment

Figure 22A:
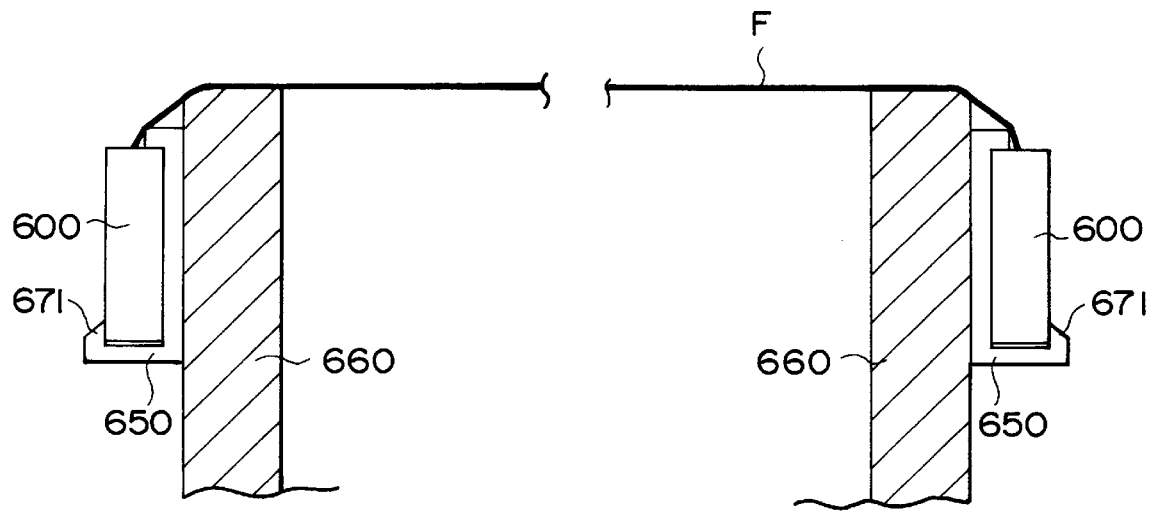
FIG. 22(a) is a view for assistance in explaining a film stretching structure in a tenth embodiment according to the present invention.
Figure 22B:
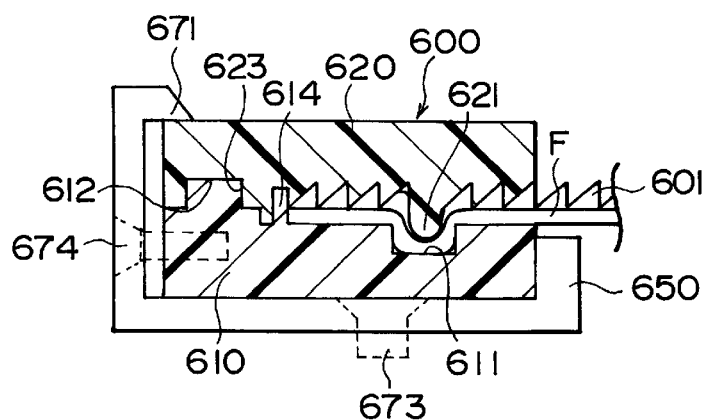
FIG. 22(b) is a sectional view of a portion of FIG. 22(a)

FIGS. 22(a) and 22(b) show a pair of film stretching structures 600 in a tenth embodiment according to the present invention for supporting a film F held taut thereon on the front surface of a cabinet 660. The film stretching structures 600 grip a film F extended across an opening of the cabinet 660 at its opposite end edges and tauten the film F. The film stretching structures 600 are held on the cabinet 660 by holding members 650 attached to the opposite side walls of the cabinet 660, respectively.

As shown in FIG. 22(b), each film stretching structure 600 has a first frame 610 and a second frame 620. An edge portion of the film F is gripped between the first frame 610 and the second frame 620. The film F is a linear Fresnel lens sheet having one surface provided with an arrangement of parallel linear lens elements 601 having the shape of a prism. A groove 611 is formed in the inner surface of the first frame 610, with which the film F is brought into contact, and a stretching projection 621 is formed on the inner surface of the second frame 620 so as to correspond to the groove 611 of the first frame 610. Parallel linear grooves of a triangular cross section complementary to that of the linear lens elements 601 are formed in the inner surface of the second frame 620. A ridge 612 is formed on the inner surface of the first frame 610, and a groove 623 is formed in the inner surface of the second frame 620. When the first frame 610 and the second frame 620 are joined together, the ridge 612 of the first frame 610 is fitted in the groove 623 of the second frame 620. A film stopper 614 projecting toward the second frame 620 is formed on the inner surface of the first frame 610 at a position between the ridge 612 and the groove 611. Each holding member 650 has a clipping portion 671 for clipping the film stretching structure 600 in place on the holding member 650. Each holding member 650 is fastened to the cabinet 660 with screws 673. The position of the film stretching structure 600 on the holding member 650 can be adjusted by turning an adjusting screw 674 screwed through the holding member 650 in a threaded hole formed in the first frame 610. The first frame 610 and the second frame 620 may be made of a heat setting resin, such as a phenolic resin or an ABS resin.

When stretching the film F on the cabinet 660 by the film stretching structure 600, the first frames 610 are fitted on the holding members 650 fastened to the cabinet. Each end edge portion of the film F is placed on the inner surface of the first frame 610 provided with the groove 611 with its edge put to the stopper 614 for positioning, the second frame 620 is joined to the first frame 610 so as to hold the end edge portions of the film between the first frame 610 and the second frame 620, and the second frame 620 is clamped on the first frame 610 by the resilience of the clipping portion 671 as shown in FIG. 22(b), in which the stretching projection 621 pushes the film F into the groove 611 to tauten the film F.

FIG. 23 is a sectional view of a film stretching structure 600A in a modification of the film stretching structure 600 of FIG. 22(a). This film stretching structure 600A has a gripping block having a first frame portion 610A and a second frame portion 620A formed integrally with the first frame portion 610A. The respective shapes of the first frame portion 610A and the second frame portion 620A are substantially the same as those of the first frame 610 and the second frame 620 of the film stretching structure 600 of the film stretching structure of FIG. 22(a). When gripping an end edge portion of a film with the film stretching structure 600A, the first frame portion 610A and the second frame portion 620A are elastically bent away from each other to expand a space therebetween as indicated in FIG. 24. Accordingly, it is preferable that the film stretching structure 600A be made of an elastically deformable resin, such as a polypropylene resin. After gripping the film F between the first frame portion 610A and the second frame portion 620A, the first frame portion 610A and the second frame portion 620A are fastened together with a screw 680 to keep the first frame portion 610A and the second frame portion 620A at their working positions.

FIG. 25(a) shows a film stretching structure 600B in another modification of the film stretching structure 600 of FIG. 22(b). The film stretching structure 600B is provided with a dovetail ridge 612B and a dovetail groove 623B instead of the ridge 612 and the groove 623 mating with the dovetail ridge 612 of the film stretching structure 600 of FIG. 22(b). The dovetail ridge 612B is able to move in the dovetail groove 623B in the direction of the depth of the dovetail groove 623B. When gripping a film F, a first frame 610 and a second frame 620 are moved away from each other as shown in FIG. 25(b) to form a space for receiving the film F.

FIG. 26 shows a film stretching structure 600C in a modification of the film stretching structure 600B shown in FIG. 25(a). In the film stretching structure 600C, a film stopper 614C of a thickness greater than that of the film stopper 614 of the film stretching structure 600B of FIG. 25(a) is projected from the inner surface of a second frame 620 toward the first frame 610.

Figure 28:
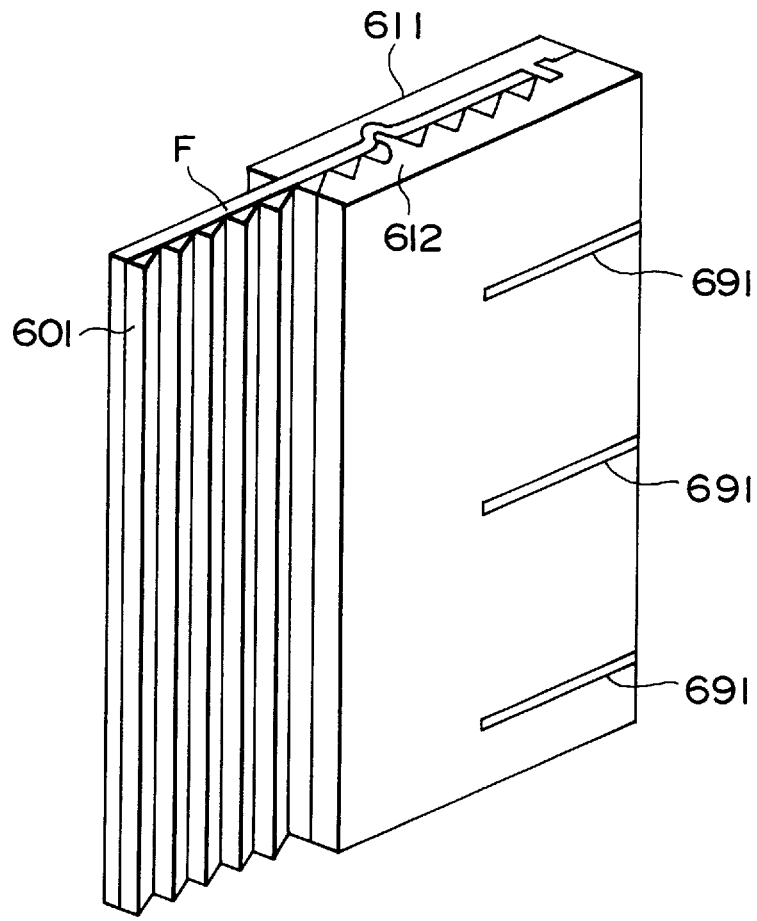
FIGS. 28(a) and 28(b) are a perspective view and a sectional view, respectively, of the film gripping unit of the film stretching structure of FIG. 22(a), showing a means for fastening together a first frame and a second frame included in the film gripping unit.
Figure 28:
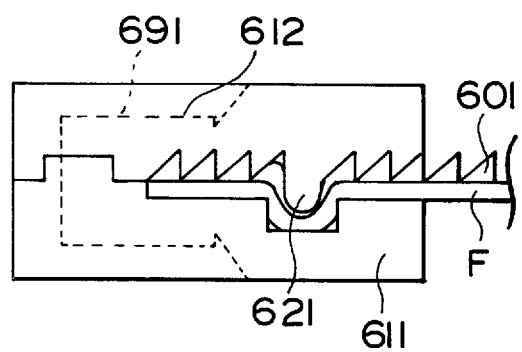

FIG. 27 is a perspective view of the film stretching structure 600 of FIG. 22(a) held on the plurality of holding members 650 arranged at intervals along the lower edge of the film stretching structure 600. In FIG. 27, the first frame 610 and the second frame 620 of the film stretching structure 600 are fastened together with screws 690 penetrating the film F. The first frame 610 and the second frame 620 may be fastened together with clips, not shown, put in grooves 691 formed in the outer surfaces of the first frame 610 and the second frame 620 as shown in FIGS. 28(a) and 28(b).

Figure 29:
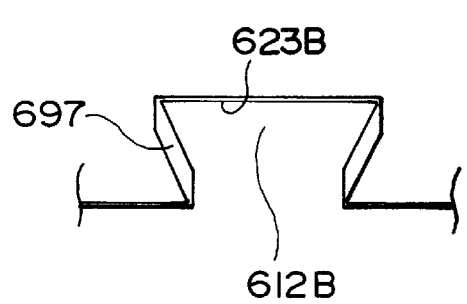
FIGS. 29(a) and 29(b) are views of different combinations each of a dovetail ridge and a dovetail groove.
Figure 29:
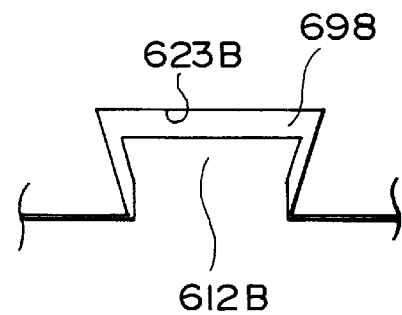

FIGS. 29(a) and 29(b) show modifications of the dovetail ridge 612B and the dovetail groove 623B of the film stretching structure 600B of FIG. 25(a). In a combination of a dovetail ridge 612B and a dovetail groove 623B shown in FIG. 29(a), gaps 697 are formed between the opposite side surfaces of the dovetail ridge 612B and the corresponding side surfaces of the dovetail groove 623B, respectively. In a combination of a dovetail ridge 612B and a dovetail groove 623B shown in FIG. 29(b), a gap is formed between the top surface of the dovetail ridge 612B and the bottom surface of the dovetail groove 623B. Either of those combinations allows the dovetail ridge 612B to move in vertical directions as viewed in FIGS. 29(a) and 29(b), and restrains the same from movement in horizontal directions as viewed in FIGS. 29(a) and 29(b). The combination shown in FIG. 29(a) is preferable because the top surface of the dovetail ridge 612B is in contact with the bottom surface of the dovetail groove 623B when the first frame 610 and the second frame 620 are fastened together, whereby reliability of the film holding performance of the film stretching structure 600 is enhanced.

Although the invention has been described in its preferred forms with a certain degree of particularity, obviously many changes and variations are possible therein. It is therefore to be understood that the present invention may be practiced otherwise than as specifically described herein without departing from the scope and spirit thereof.

What is claimed is:

1. A film stretching structure for stretching a film or a sheet comprising:

a frame structure having a support surface for supporting a film to be stretched at an end edge portion thereof;

gap forming means for forming a gap in the support surface of the frame structure;

stretching means associated with said frame structure, said stretching means being adapted to be forced into the gap together with the end edge portion of the film placed on the support surface of the frame structure so as to tar cover the gap; and holding means for securely holding the stretching means in place in the gap so that the film is pulled toward the gap and kept taut by the stretching means forced into the gap.

2. The film stretching structure according to claim 1, wherein the frame structure comprises an outer frame and an inner frame, which are combined so as to form the gap therebetween.

3. The film stretching structure according to claim 1, wherein said stretching means comprises a bar-shaped stretching member, and said holding means comprises opposite end portions of the stretching member, and portions of the frame structure corresponding to the opposite ends of the gap and provided with recesses formed so as to engage with the opposite ends of the stretching member, respectively.

4. The film stretching structure according to claim 3, wherein said stretching member is provided with projections at opposite ends thereof, and each of the projections has a curved back surface.

5. The film stretching structure according to claim 3, wherein said stretching member is provided with a longitudinal groove in a surface opposite a working surface thereof to be brought into contact with a film, and a pushing tool is applied to the longitudinal groove when pressing the stretching member into the gap.

6. The film stretching structure according to claim 1, wherein said stretching means includes stretching projections formed on a stretching-and-covering member detachably attached to the frame structure, and said holding means includes the stretching-and-covering members.

7. The film stretching structure according to claim 6, wherein said stretching-and-covering member is of an L-shaped cross section and has on an end thereof a holding ridge for engagement with a recess formed in the frame structure.

8. The film stretching structure according to claim 1, wherein said gap is a groove formed in the surface of the frame structure, and the stretching means comprises a bar-shaped stretching member to be fitted in the groove.

9. The film stretching structure according to claim 8, wherein said groove has a cross section having a narrow opening, and the stretching member is made of an elastic material and is capable of being pressed into the groove.

10. The film stretching structure according to claim 9, wherein a surface defining said groove is provided with projections.

11. The film stretching structure according to claim 9, wherein said stretching member is provided on its circumference with projections.

12. The film stretching structure according to claim 9, wherein a surface defining said groove is provided with projections and recesses, and said stretching member is provided on its circumference with projections and recesses complementary to those of said groove.

13. The film stretching structure according to claim 8, wherein said holding means comprises a stretching-and-clamping member detachably attached to the frame structure, said stretching and clamping member having a pushing ridge to be pressed into the groove so as to push the stretching member pressed in the groove.

14. The film stretching structure according to claim 1, wherein said gap is a groove formed in the surface of the frame structure, said stretching means comprises a stretching portion to be pressed into the groove, and said holding means comprises a fastening member detachably mountable on the frame structure, and formed integrally with the stretching portion.

15. The film stretching structure according to claim 14, wherein said groove has a cross section having a narrow opening, and the stretching portion is capable of elastic deformation.

16. The film stretching structure according to claim 14, wherein said groove has a side wall formed with a ridge, and said stretching portion has a part conforming to the side wall provided with the ridge.

17. The film stretching structure according to claim 14, wherein the groove of said frame structure has an inclined side surface, and the stretching portion slides along and is distorted by the inclined surface in a direction to tauten the film when the stretching portion is pressed into the groove together with the film.

18. The film stretching structure according to claim 1, wherein said frame structure comprises an outer frame and an inner frame, which are put one upon the other, said gap is a groove formed in a surface of the inner frame facing the outer frame, said stretching means comprises a stretching member to be pushed into the groove, said holding means is formed by the outer frame, and the stretching means is placed on the outer frame.

19. The film stretching structure according to claim 18, wherein said stretching member is fitted in a groove formed in the outer frame.

20. The film stretching structure according to claim 18, wherein said stretching member is formed integrally with the outer frame.

21. The film stretching structure according to claim 19, wherein said stretching member is elastically movable relative to the groove formed in the outer frame.

22. The film stretching structure according to claim 19, wherein the length of a portion of the stretching member projecting from the outer frame is adjustable.

23. The film stretching structure according to claim 18, wherein said outer frame and said inner frame have a common integral portion.

24. The film stretching structure according to claim 18, wherein said outer frame has a surface facing said inner frame, said surface having projections and recesses complementary to a shape of a surface of the film.

* * * * *

UNITED STATES PATENT AND TRADEMARK OFFICE
CERTIFICATE OF CORRECTION

PATENT NO. : 5,809,624
DATED : September 22, 1998
INVENTOR(S) : Satoshi NAKAMAE et al.

It is certified that error appears in the above-indentified patent and that said Letters Patent is hereby corrected as shown below:

On the Title page, Pleae insert the following change to item

[75] Inventors:

-- Change "Sinjuku-Ku" to --Tokyo-To--.

Signed and Sealed this

Twenty-second Day of December, 1998

Attest:

BRUCE LEHMAN

Attesting Officer       Commissioner of Patents and Trademarks